United States Patent [19]

Akanabe

[11] Patent Number: 5,309,274
[45] Date of Patent: May 3, 1994

[54] OPTICAL BEAM SCANNING APPARATUS

[75] Inventor: Yuichi Akanabe, Hino, Japan

[73] Assignee: Konica Corporation, Hino, Japan

[21] Appl. No.: 22,625

[22] Filed: Feb. 25, 1993

[30] Foreign Application Priority Data

Feb. 28, 1992 [JP] Japan .................. 4-043662

[51] Int. Cl.$^5$ ............................................. G02B 26/08
[52] U.S. Cl. .................................. 359/209; 359/210; 359/211; 359/219; 359/201; 358/491; 358/493
[58] Field of Search ............... 359/196, 209, 210, 211, 359/220, 201, 216, 219, 836; 358/474, 487, 489, 490, 491, 493

[56] References Cited

U.S. PATENT DOCUMENTS

| | | | |
|---|---|---|---|
| 3,532,037 | 10/1970 | Neuilly et al. | 359/211 |
| 3,875,587 | 4/1975 | Pugsley | 359/211 |
| 4,154,507 | 5/1979 | Barr | 359/216 |
| 4,294,506 | 10/1981 | Hattori | 359/218 |
| 4,318,583 | 3/1982 | Goshima et al. | 359/216 |
| 4,376,582 | 3/1983 | Kirchner et al. | 359/211 |
| 4,550,985 | 11/1985 | Hayashi | 359/209 |
| 4,699,447 | 10/1987 | Howard | 359/220 |
| 5,026,133 | 6/1991 | Roddy et al. | 359/210 |
| 5,170,278 | 12/1992 | Wada et al. | 359/216 |
| 5,214,528 | 5/1993 | Akanabe et al. | 359/211 |

FOREIGN PATENT DOCUMENTS

| | | |
|---|---|---|
| 264341 | 4/1988 | European Pat. Off. . |
| 475399 | 3/1992 | European Pat. Off. . |
| 483827 | 5/1992 | European Pat. Off. . |
| 57-151933 | 9/1982 | Japan . |
| 59-119960 | 7/1984 | Japan . |
| 63-158580 | 7/1988 | Japan . |

OTHER PUBLICATIONS

English-language Abstract of Japanese Unexamined Patent Publication No. 63-158580, entitled "Internal Drum Plotter" (Jul. 1, 1988).

English-language Abstract of Japanese Unexamined Patent Publication No. 59-119960, entitled "Exposure Device of Hard Copy" (Jul. 11, 1984).

English-language Abstract of Japanese Unexamined Patent Publication No. 57-151933, entitled "Laser Rotary Printer" (Sep. 20, 1982).

*Primary Examiner*—Loha Ben
*Attorney, Agent, or Firm*—Finnegan, Henderson, Farabow, Garrett & Dunner

[57] ABSTRACT

An optical beam scanning apparatus of this invention includes rotary optical element rotating on an axis of rotation and guiding optical beams incident parallel to the axis of rotation to a direction rectangular to the axis of rotation so as to scan a cylindrical surface inside a cylinder by rotating the optical beams in a peripheral direction. An anamorphic optical system rotating on a straight line substantially coinciding with the axis of rotation, for example, is disposed as optical beam rotation element on the incident side of the optical beams of the rotary optical element, and the optical beams incident into the rotary optical element are rotated at the same rotating speed as that of the rotary optical element on the straight line as the axis of rotation. According to this structure, a plurality of optical beams do not corss one another on the cylindrical surface when they are used, but form substantially parallel beam lines. Accordingly, multiple beam scanning as well as high speed recording becomes possible.

19 Claims, 25 Drawing Sheets

PRIMARY SCANNING DIRECTION ⇒

PRIMARY SCANNING DIRECTION ⇒

OPTICAL BEAM SCANNING APPARATUS

BACKGROUND OF THE INVENTION

1. Field of the Invention

The present invention relates to an optical beam scanning apparatus in the field of the technique of recording images by scanning optical beams such as laser beams. More particularly, the present invention relates to an optical beam scanning apparatus of the type effective for a system where a combination of large format and a small focussed beam diameter is required, such as a plotters for graphic arts or a film plotter for generating printed-circuit-board artwork.

2. Description of the Related Art

Optical beam scanning apparatus of this kind includes an image recording method which is referred to as an "Internal drum scanning configuration: and records an image by rotating and scanning optical beams inside a cylinder in its peripheral direction with respect to a photosensitive material fitted to a cylindrical surface of a fixed drum (hereinafter referred to as the "cylinder") (Japanese Unexamined Patent Publication No. 63-158580).

According to this configuration, the photosensitive material is loaded to the cylindrical surface of the cylinder. The optical beams from a light source are allowed to be incident along a central axis of the cylinder, and are reflected in a rectangular direction inside the cylinder by an optical reflection device (hereinafter referred to as the "rotary reflection device") such as a reflecting mirror or a rectangular prism which is rotated by a motor with the central axis of the cylinder being the axis of rotation. The optical beams are then condensed by a condenser lens in an optical path, and the optical beams thus condensed are scanned (hereinafter primary scanning) on the photosensitive material loaded to the cylindrical surface of the cylinder. The motor, the rotary reflection device and the condenser lens are moved in an axial direction by a driving mechanism (hereinafter subsidiary scanning), and in this way, an image is recorded (exposed).

The photosensitive material can be fitted to the cylindrical surface by retaining it on the inner surface of the cylinder, or by retaining it on an outer surface of a cylinder made of a transparent member.

According to this configuration, the optical beams which are incident substantially parallel to the axis of rotation are reflected substantially in the rectangular direction by the rotary reflection device rotating on the central axis of the cylinder as the axis of rotation thereof, so that the photosensitive material loaded to the cylindrical surface can be scanned and exposed.

The reflecting direction of the optical beams is not necessarily right angle. If they are reflected in a direction different from the right angle, the distance between the reflection point and the exposure point becomes large, and the size of the optical beams on the cylindrical surface in the axial direction of the cylinder becomes large, as well. The reflecting direction may differ from right angle within such a range where the increases in the distance and the size described above do not exert adverse influences in practice.

The advantage brought forth by this configuration is that a rotating speed can be increased and hence, a recording speed can be increased more easily because a moment of inertia in this system is smaller than that in a rotating drum configuration.

Further, the photosensitive material can be held stably in place because it is fixedly hold on the cylinder. Subsidiary scanning can be carried out by sliding the photosensitive material on the cylindrical surface but in this case, there occur the problems in that a subsidiary scanning speed becomes unstable due to friction and the photosensitive material is likely to be damaged. Unless sliding is effected smoothly, floating of the photosensitive material might occur. In the case of multiple beam recording, the photosensitive material must be kept stably so that exposure by the final beam of multiple beams can be correctly followed by the exposure by the leading beam of a subsequent primary scanning.

Subsidiary scanning may be effected by moving a part, or the whole, of an optical system including the rotary optical means in the axial direction of the cylinder. It may be effected, too, by fixing the optical system and moving the cylinder having the photosensitive material fixed thereto as a whole, on the contrary.

Another advantage of this configuration is that a relatively large recording format can be obtained by the use of a condenser lens having a small focal length in comparison with a so-called "flat-field scanning method".

The advantage obtained by the use of a lens having a small focal length is that a small condensed beam diameter necessary for recording high image quality can be obtained easily, and the scanning line interval can be reduced, too. Furthermore, it is easy to keep the beam diameter and the beam shape on the cylindrical surface substantially constant throughout substantially the full periphery by accurately adjusting the axis of rotation of the rotary reflection device with the central axis of the cylinder. Accordingly, image quality can be improved more easily.

A scanning width of from about 70 to about 80% of the full peripheral length of the cylinder is easily obtained even when limitations from mechanical arrangement of inlet and outlet openings for the photosensitive material, the rotation mechanism of the rotary reflection device and the mechanical arrangement of the subsidiary scanning mechanism, and so forth, are taken into consideration. The focal length of the condenser lens is somewhat greater than the radius of the cylinder, and a scanning width about three times the focal length can be obtained easily. Accordingly, a recording size, too becomes sufficiently large.

By the way, the condenser lens may be disposed in the optical path between the rotary reflection device and the photosensitive material, and may be rotated integrally with the rotary reflection device. In this case, there occurs a disadvantage that the moment of inertia of the rotating members increases, but the focal length of the condenser lens can be further made smaller than the radius of the cylinder and a smaller condensed beam diameter can be obtained more easily. On the contrary, there is the advantage that the diameter of the beams incident into the condenser lens can be reduced in order to obtain a predetermined condensed beam diameter.

The explanation given above can be summarized as follows. In accordance with the internal drum scanning configuration, the moment of inertia of the rotating members is small, so that the rotating speed can be increased easily and hence, the recording speed can be increased easily. It is easy to simultaneously satisfy the requirements for image quality and the recording size, and the size of the apparatus can be reduced easily to obtain the same recording size.

As described above, the optical beam scanning apparatus according to the conventional internal drum scanning configuration has the advantages described above and can easily increase the rotating speed and hence, the recording speed. Nonetheless, in order to further increase the recording speed by a single optical beam, the rotary reflection device must be rotated at an extremely high revolution speed which usually has practical limitation. To further increase the recording speed, therefore, a multiple beam scanning method is used in combination. In this case, however, the use of multiple beams is difficult, and the recording speed cannot be increased so easily.

The multiple beam scanning method is the system which utilizes a plurality of optical fibers, etc., as a light source, and effects primary scanning several times per rotation by the use of a plurality of optical beams.

The reason why the multiple beam scanning method is difficult to use is because when a plurality of optical beams are reflected by the rotary reflection device to scan on the cylindrical surface, these optical beams cross one another at two oppositions on the cylindrical surface and do not form parallel scanning lines necessary for image recording.

Even when recording is carried out only within a part of the range of the cylinder but not throughout the full periphery, a plurality of optical beams undergo curving, even though they do not cross one another, and are not suitable for multiple beam scanning for image recording.

To solve this problem Japanese Unexamined Patent Publication Nos. 59-119960 and 57-151933 disclosed a method which mounts a plurality of light sources, or a plurality of light sources together with their driving circuits, on a rotary member disposed inside a cylinder, and rotates the rotary member with the central axis of the cylinder being an axis of rotation thereof, so as to accomplish multiple beam scanning.

According to this method, however, it is necessary to mount a plurality of light sources, an electronic circuit for modulating them, a power generator for supplying power to the electronic circuit, a power source stabilization circuit, and so forth, to the rotary member. Furthermore, a mechanism for stably holding these circuits on the rotary member must be disposed. Accordingly, when the rotary member rotates, its moment of inertia is great, and there is a limit to obtain a high rotating speed.

SUMMARY OF THE INVENTION

In view of the problems with the prior art described above, the present invention is directed to provide an optical beam scanning apparatus which accomplishes multiple beam scanning in the internal drum scanning system and hence, high speed recording.

Furthermore, the present invention is directed to provide an optical beam scanning apparatus which can further improve a recording speed and is excellent in image quality as well as in a scanning width, by providing more definite embodiments for each means that constitutes such an optical beam scanning apparatus.

To accomplish the objects described above, the present invention provides an optical beam scanning apparatus including rotary optical means rotating on an axis of rotation and guiding optical beams incident substantially parallel to the axis of rotation to a direction substantially rectangular to the axis of rotation, and rotating the optical beams in a peripheral direction inside a cylinder to scan a cylindrical surface, comprising anamorphic optical systems rotating on straight lines substantially coinciding with the axis of rotation on the incident side of the optical beams of the rotary optical means, as axes of rotation thereof; and optical beam rotation means for rotating the optical beams incident into the rotary optical means on the straight lines as the axes of rotation at the same rating speed as that of the rotary optical means.

More definitely, the optical beam rotation means comprises the combination of two anamorphic optical systems, or the combination of one anamorphic optical system and a reflecting surface for reflecting the optical beams in such a manner as to permit the optical beams to pass twice through the anamorphic optical system.

The optical beam scanning apparatus according to the present invention includes further optical beam rotation means including an optical structure rotating on a straight line substantially coinciding with the axis of rotation described above as an axis of rotation thereof on the incident side of the optical beams of the rotary optical means, wherein the optical structure comprises a set of reflecting surfaces rectangular to each other, and the optical beam rotation means rotates the optical beams incident into the rotary optical means on the straight line as an axis of rotation at the same speed as the rotary optical means.

The optical beam scanning apparatus according to the present invention includes further optical beam rotation means including an optical structure rotating on a straight line substantially coinciding with the axis of rotation described above as an axis of rotation thereof on the incident side of the optical beams of the rotary optical means, wherein the optical structure comprises means for refracting, reflecting or diffracting the optical beams, and a set of mutually rectangular reflecting surfaces located on the extension of optical paths of the optical beams passing through the means, one of the reflecting surfaces being rectangular to the straight line with the other being parallel to the straight line, and wherein the optical beam rotation means rotates the optical beams on the straight line as the axis of rotation at the same rotating speed as that of the rotary optical means.

The optical beam scanning apparatus according to the present invention includes further optical beam rotation means including an optical structure rotating on a straight line substantially coinciding with the axis of rotation described above as an axis of rotation thereof on the incident side of the optical beams of the rotary optical means, wherein the optical structure comprises means for refracting, reflecting or diffracting the optical beams and a set of rectangular reflecting surfaces disposed on the extension of optical paths of the optical beams passing through the means, and having the crossing line in parallel with the straight line, and wherein the optical beam rotation means rotates the optical beams incident into the rotary optical means on the straight line as the axes of rotation thereof at the same rotating speed as that of the rotary optical means.

The rotary optical means described above comprises a rotary reflecting device for reflecting the optical beams incident substantially parallel to the axes of rotation to a substantially rectangular direction. Alternatively, the rotary optical means comprises a member rotating on the axis of rotation described above and an optical fiber bundle held on the member, one of the end surfaces of the optical fiber bundle being located substantially rectangularly to the axis of rotation in the proximity of the axis of rotation, and the other of the end surfaces being disposed substantially rectangularly to a radial direction of the rotation.

In the construction described above, a plurality of optical beams incident into the rotary optical means are rotated by the optical structure as the optical beam rotation means, such as the anamorphic optical system, etc., at the same rotating speed as the rotating speed of the rotary optical means and on an axis of rotation which is substantially coincident with the axis of rotation of the rotary optical means. According to this arrangement, a plurality of optical beams emitted from the rotary optical means do not cross one another, but form beam lines substantially parallel to one another, on the cylindrical surface. Accordingly, multiple beam scanning becomes feasible, and hence, high speed recording becomes possible.

In this case, the photosensitive material is preferably fixed on the cylindrical surface and the cylindrical surface and the rotary optical means are relatively moved with respect to the axis direction of the cylinder so as to record the image.

These and other objects, novel features and the action and effect of the present invention will become more apparent from the following description of preferred embodiments thereof when taken in conjunction with the accompanying drawings.

DESCRIPTION OF THE PREFERRED EMBODIMENT

Prior to the explanation of the preferred embodiment of the present invention, the outline of the internal drum scanning system according to the prior art and the mode of mutual crossing of a plurality of optical beams on a cylindrical plane when multiple beams are used in this system, will be explained with reference to the drawings.

Figure 26:
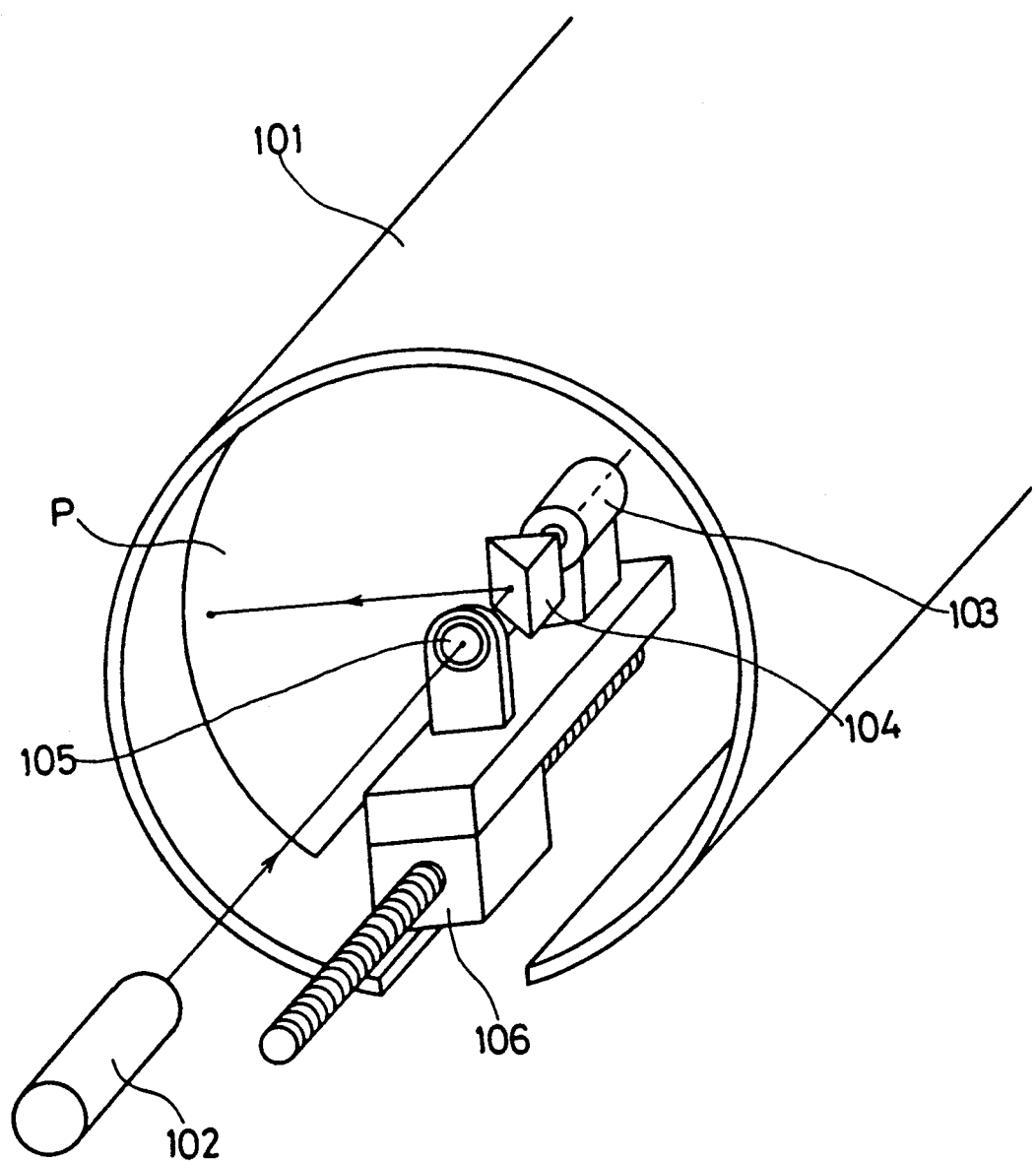
FIG. 26 is a schematic view showing the outline of an optical beam scanning apparatus of a internal drum scanning system according to the prior art.

FIG. 26 shows the outline of the internal drum scanning system according to the prior art.

A photosensitive material P is loaded to a cylindrical surface of a cylinder 101, and an optical beam from a light source 102 is allowed to be incident along the central axis of the cylinder 101, and is reflected in a rectangular direction by a rotary reflecting device 104 such as a reflecting mirror or a rectangular prism that is rotated by a motor 103 inside the cylinder 101 with the axis of this cylinder 101 being the axis of rotation. The optical beam is condensed by a condenser lens 105 in the optical path, so that the condensed optical beam is primarily scanned on the photosensitive material P fitted to the cylindrical surface of the cylinder 101. The motor 103, the rotary reflecting device 104 and the condenser lens 105 are moved in the axial direction by a subsidiary scanning mechanism 106 which is driven by a motor, not shown in the drawings, and in this way, an image is recorded (exposed).

Next, the mode of mutual crossing of a plurality of optical beams on the cylindrical surface (on the inner surface, for example), when the multiple beams are used in the conventional internal drum scanning system, will be explained with reference to FIGS. 27 to 30.

In these drawings as well as in the description which will follow, the beams will be represented by geometo-optical rays of light for simplification. In other words, although the actual beams have definite extension, they will be represented by suitable rays included within the beams because they condense into one point near the inner surface of cylinder within the range of extension due to aberration and diffraction.

Figure 27A:
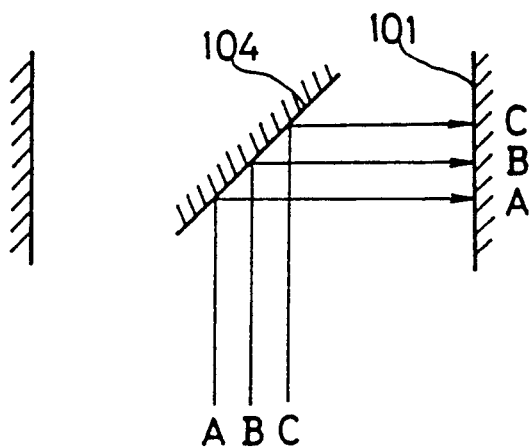
FIGS. 27(a) and 27(b) are views showing parallel beams and illustrates a problem with the prior art.
Figure 27B:
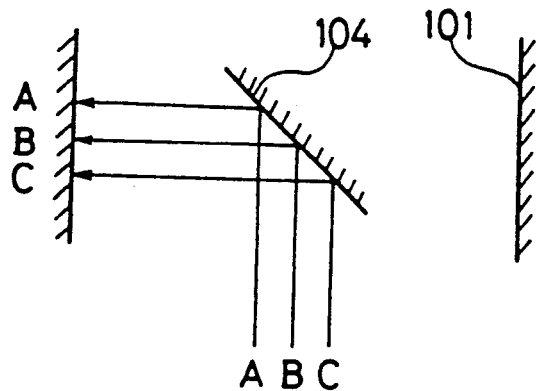

FIGS. 27(a) and 27(b) shows the case where three mutually parallel beams A, B and C are incident into a reflecting plane of the rotary reflecting device 104 and are projected to the inner surface of the cylinder 101. The actual intervals between these beams A, B and C are very small from the purpose of multiple beam scanning for image recording, but the intervals are shown in magnification so as to have the drawings more easily understood.

The beam B is the one that coincides with the axis of rotation of the rotary reflecting device 104.

It can be appreciated from the geometrical consideration that when the rotary reflecting device 104 rotates by 180° and moves from the position shown in FIG. 27(a) to the position shown in FIG. 27(b), the vertical relationship between the beams A and C is reversed.

It can be further understood that the beams A and C cross each other at a position between the positions shown in FIGS. 27(a) and 27(b) on the inner surface of the cylinder 101.

Figure 28A:
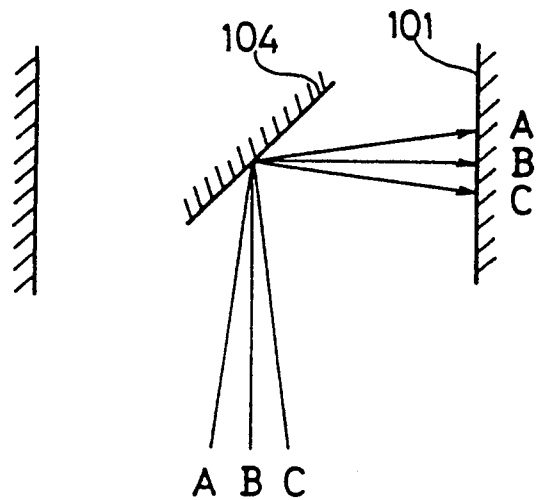
FIGS. 28(a) and 28(b) are views showing inclined beams and illustrates a problem with the prior art.
Figure 28B:
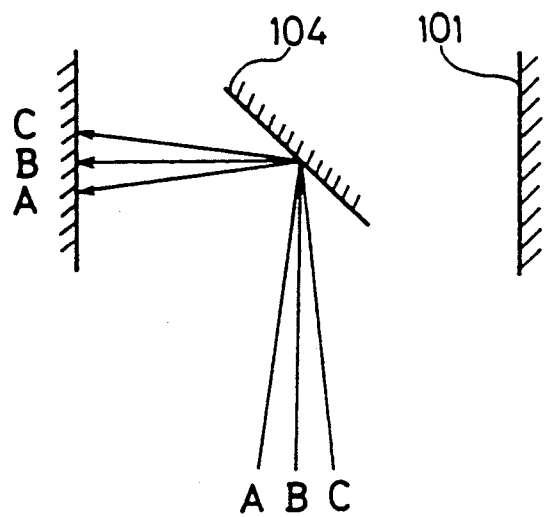

Even if the beam A and the beam C are inclined at a very small angle and are allowed to be incident so that they coincide with the beam B on the reflecting plane of the rotary reflecting device 104 as shown in FIGS. 28(a) and 28(b), it can be understood that the vertical location of the beams A and C is reversed, too, when the rotary reflecting device 104 rotates and reaches the position shown in FIG. 28(b) from the position shown in FIG. 28(a). In this case, too, the angles of the beams A, B and C are very small from the purpose of multiple beam scanning, but they are illustrated at greater angles to have the drawing more easily understood.

Figure 29:
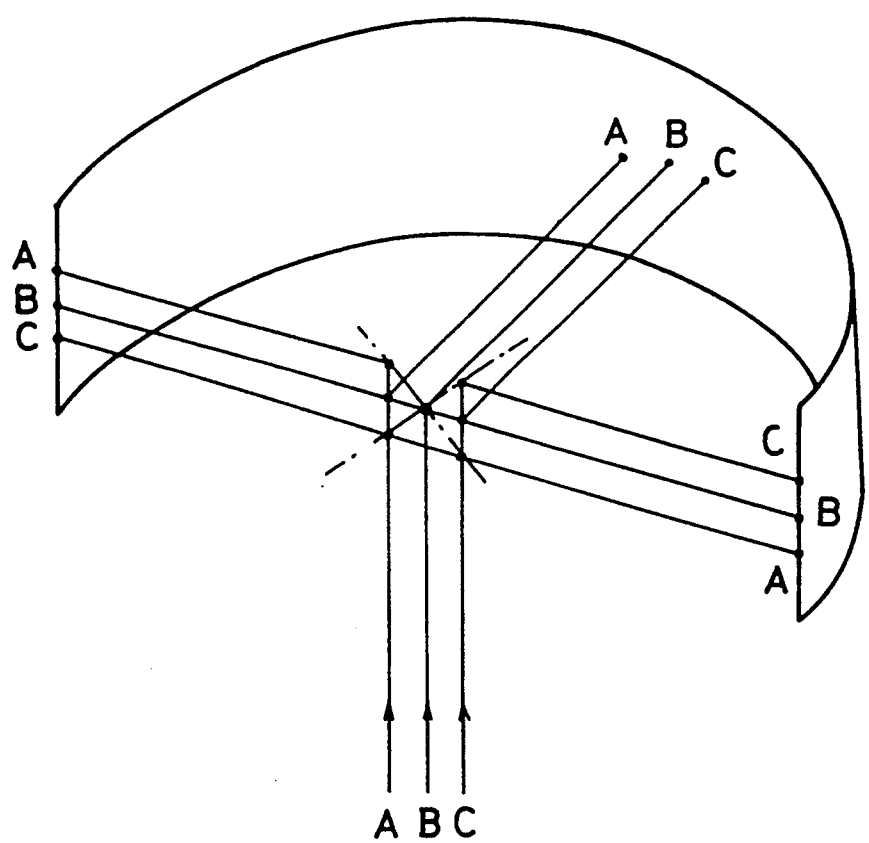
FIG. 29 is a perspective view showing the mode of crossing of beams in the prior art scanner.
Figure 30:
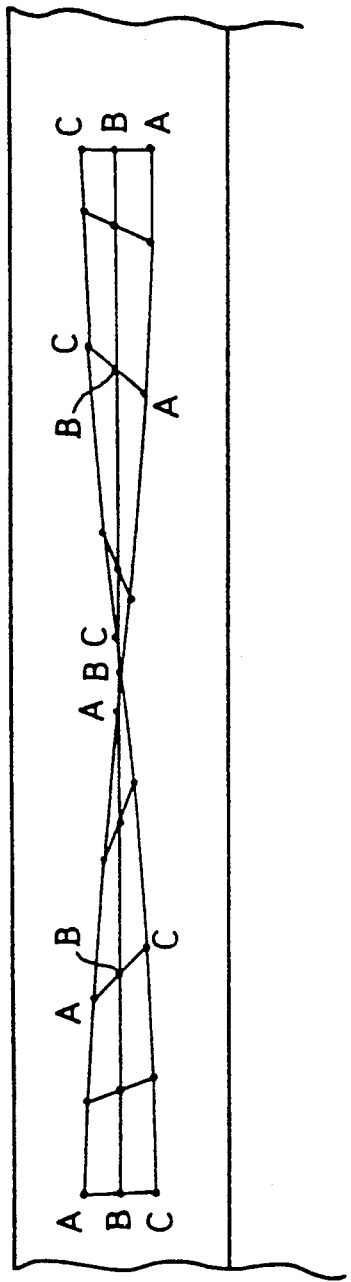
FIG. 30 is a development view of FIG. 29.

FIGS. 29 and 30 are a perspective view and a development covering the semi-circle of the inner surface of the cylinder, and show the mode in which the beams A, B and C mutually cross.

It will be obvious from the explanation given above that the beam A and the beam C undergo curving, though they do not cross each other, when recording is made at a part of the range of the cylinder, though not throughout the full periphery of the cylinder, and that such a curve or crossing is not suitable for multiple beam scanning for image recording.

Next, a preferred embodiment of the present invention will be explained with reference to the drawings.

Figure 1:
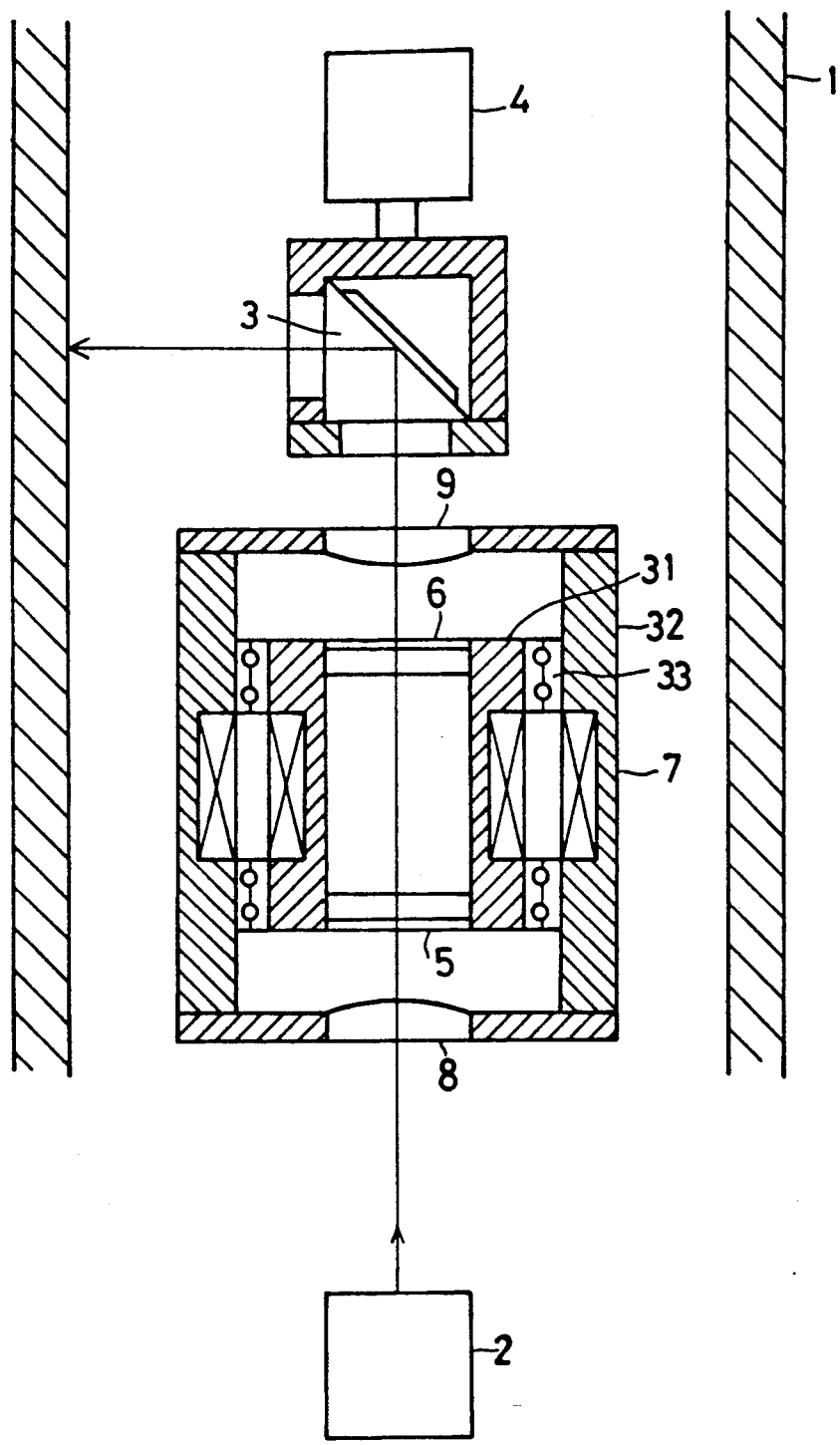
FIG. 1 is a view showing an optical beam scanning apparatus according to one embodiment of the present invention.

FIG. 1 is a view showing an embodiment of the present invention.

Reference numeral 1 denotes a cylinder, to which a photosensitive material is loaded. In this case, the photosensitive material, not shown, is retained on the inner surface of the cylinder.

Reference numeral 2 denotes an optical beam generator (light source), which emits a plurality of optical beams along the central axis of the cylinder 1. Means for obtaining a plurality of beams may be a system which applied a radio frequency of multiple frequencies to an acousto-optical modulator, or a plurality of optical fibers may be used. Still alternatively, an optical beam may be split by optical means such as a beam splitter, or a plurality of independent light sources may be prepared and employed.

Reference numeral 3 denotes a rotary reflecting device as rotary optical means. This rotary reflecting device reflects an optical beam incident along the central axis of the cylinder 1 to a substantially rectangular direction, and is rotated by a motor 4 around the central axis of the cylinder 1 as the axis of rotation. In this embodiment, a rectangular prism is used as the rotary reflecting device 3.

Reference numerals 5 and 6 denote two anamorphic optical systems as optical beam rotation means, and they are rotated in the same direction as the rotating direction of the rotary reflecting device 3 by a motor 7 around a straight line, which substantially coincides with the axis of rotation of the rotary reflecting device 3, as the axis of rotation, and at a rotating speed of ½ of that of the rotary reflecting device 3. Accordingly, the optical beams incident into the rotary reflecting device 3 are rotated at the same rotating speed as that of the rotary reflecting device 3 with the straight line described above as the axis of rotation. In this embodiment, cylindrical lenses are used as the anamorphic optical systems 5 and 6.

Reference numeral 8 denotes a collimator lens, which allows those optical beams which are emitted from the light source 2 with certain expansion to be incident as substantially parallel beams into the anamorphic optical system (cylindrical lens) 5.

Reference numeral 9 denotes a condenser lens, which condenses the optical beams outgoing from the anamorphic optical system (cylindrical lens) 6 to a position near the inner surface of the cylinder 1 through the rotary reflecting device 3.

Incidentally, a subsidiary scanning mechanism, and the like. are omitted to simplify the illustration.

First of all, the operation of the anamorphic optical systems 5, 6 will be explained.

The anamorphic optical system is the one that has different powers in mutually rectangular directions, as typified by the cylindrical lens.

Figure 2A:
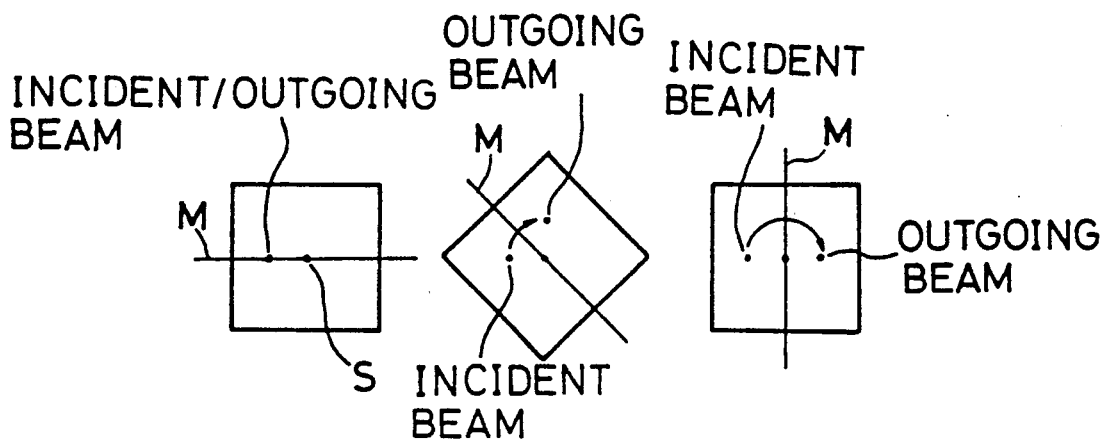
FIGS. 2(a) and 2(b) are views showing the operation of an anamorphic optical system.
Figure 2B:
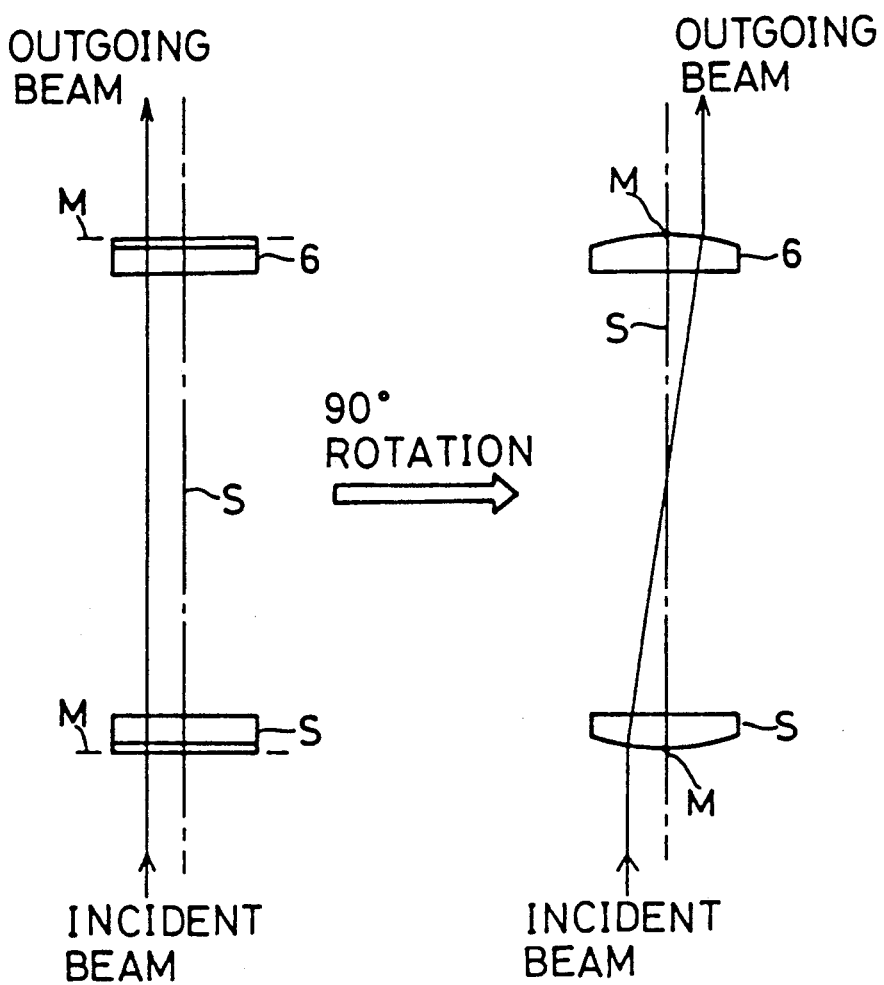

The optical beam rotating function of the anamorphic optical system will be explained about an example where two cylindrical convex lenses having an equal focal length are used, with reference to FIGS. 2(a) and 2(b).

The central line of the cylindrical lens not having power (M in the drawing) is referred to as a "generator".

Two cylindrical lenses 5 and 6 are located with a distance twice their focal length between them and the generators are in parallel with each other and their cylindrical surfaces face outward. When the cylindrical lenses are rotated with a straight line (S in the drawing) crossing rectangularly the generators as the axis of rotation, the optical beam incident in parallel with the axis of rotation S crosses rectangularly the generator M at a certain rotating position, and at this time, the optical beam travels straight (the left side portion of the drawing). When the two cylindrical lenses 5 and 6 are rotated by 90° from this state, the optical beam outgoes from the position rotated by 180° (the right side in the drawing).

In other words, when the two cylindrical lenses 5 and 6 are rotated, the optical beam incident in parallel with the axis of rotation S of the cylindrical lenses outgoes from a position of symmetry of planes with respect to a plane including the generator M and the axis of rotation S.

Accordingly, when the two cylindrical lenses 5 and 6 are rotated, the outgoing beam describes a circle having the center thereof on the axis of rotation S and a radius thereof equal to the gap between the axis of rotation S and the incident beam, when viewed from the direction of the optical axis. In this instance, the outgoing beam rotates twice when the two cylindrical lenses 5 and 6 rotate once.

The rotation of a plurality of optical beams outgoing from mutually adjacent points on a focal plane due to the optical beam rotation function of the anamorphic optical system described above will be explained in the arrangement shown in FIG. 3. It will be assumed hereby that the focal length of the collimator lens 8 is $f_1$, the focal length of the two cylindrical lenses 5 and 6 are equal to each other and are $f_2$, and the focal length of the condenser lens 9 is $f_3$.

Three optical beams are called A, B and C, and B is the optical beam that outgoes from the optical axis. Let's consider condensation of the optical beam A. As to the direction of the cylindrical lenses 5 and 6 in which power does not exist, the beams A condense on the opposite side to the outgoing point with respect to the optical axis due to the collimator lens 8 and the condenser lens 9 as shown on the left side of the drawing. As to the direction of the cylindrical lenses 5 and 6 in which power exist, on the other hand, the beams A once condense on the opposite side to the outgoing point with respect to the optical axis between the two cylindrical lenses 5 and 6, again expand, and thereafter condense once again, as shown on the right side of FIG. 3. As a result, the condensing position on the condensing plane of the optical beams A exists on the same side as the outgoing point. This also holds true of the optical beam C.

Figure 3:
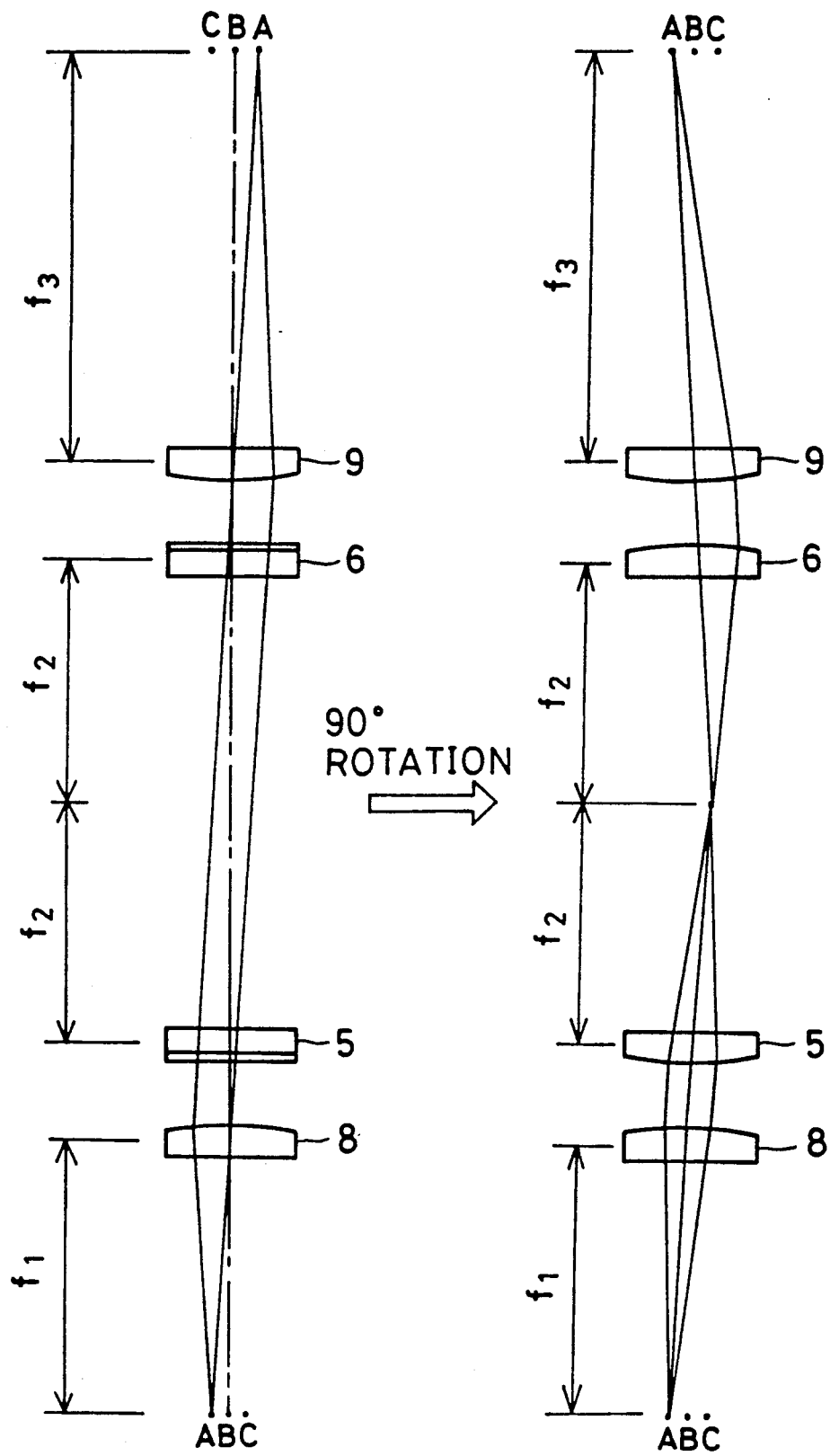
FIG. 3 is a view showing the operation when a collimator lens and a condenser lens are combined with each other.

It can be appreciated from the explanation given above that when the two cylindrical lenses 5 and 6 are rotated with the optical axis being the center in the arrangement such as shown in FIG. 3, a plurality of optical beams can be rotated on the condensing plane at a rotating speed twice the rotating speed of the cylindrical lenses 5 and 6.

Incidentally, when the axis of rotation of the cylindrical lenses does not completely coincide with the plane including the generator, the motion of the plane includes not only the rotation component but also the revolution component. For this reason, the trajectory of the condensing beam somewhat deviates from the circular motion but in this case, too, the relative positional relationship of a plurality of beams remains substantially constant and the condensing beam lines cause rotary motion as a whole.

Next, the rotary reflecting device 3 is placed at the back of the two cylindrical lenses 5 and 6, and is rotated around the same axis of rotation as that of the optical beam and at the same rotating as that of the optical beams and at the same rotating speed as that of the latter. Then, the condensing point of each optical beam describes parallel trajectories on the cylindrical surface, as can be understood from the geometric observation.

Figure 4:
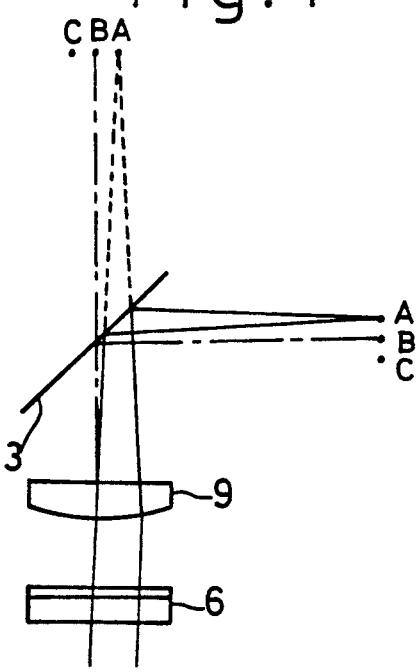
FIG. 4 is a view showing the operation when a rotary reflecting device is combined.
Figure 5:
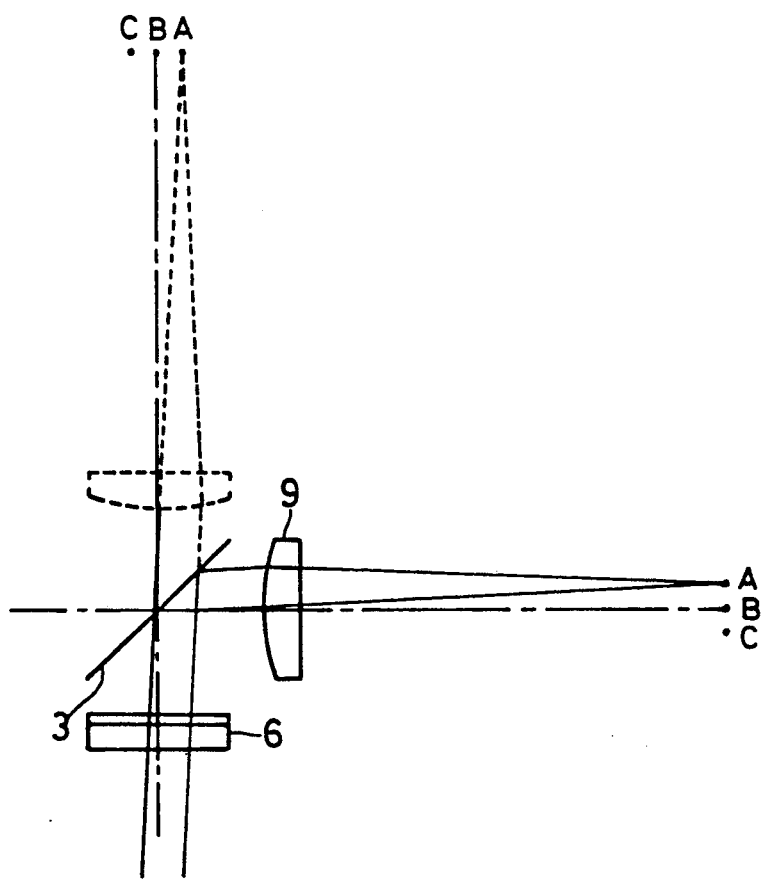
FIG. 5 is a view showing the operation when the position of a condenser lens is changed.

By the way, the condenser lens 9 may be interposed in the optical path in front of the rotary reflecting device 3 as shown in FIG. 4, or may be disposed in the optical path at the back of the rotary reflecting device 3 of the outgoing beam as shown in FIG. 5, and be integrally rotated with the reflecting device 3 round the axis of rotation of the latter.

In this way, a plurality of optical beam lines can be scanned mutually in parallel on the cylindrical surface of the cylinder 1.

The rotary optical means may not be limited only to devices for reflecting the beams (rotary reflecting device 3) such as a reflecting mirror or a rectangular prism but also an optical fiber bundle obtained by bundling a plurality of optical fibers.

Figure 6:
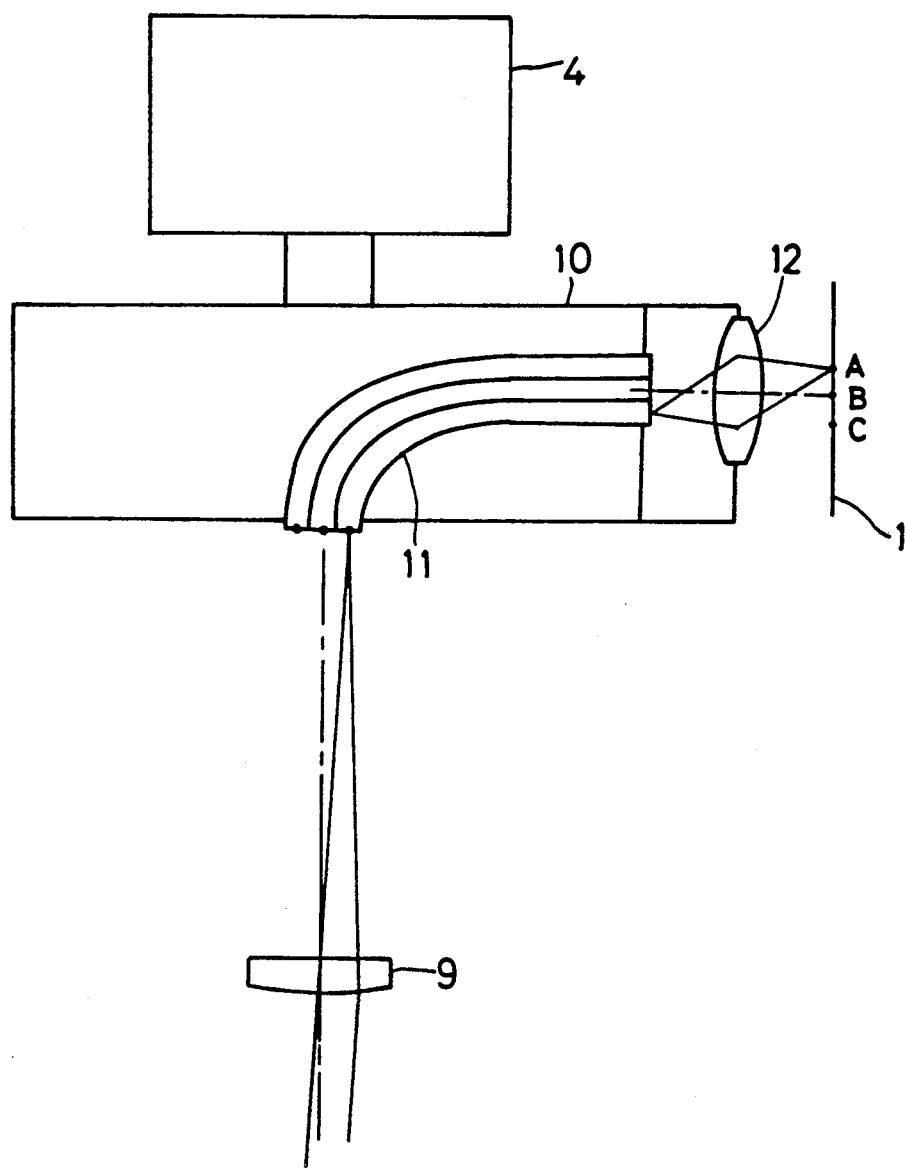
FIG. 6 is a view showing an embodiment wherein an optical fiber bundle is used as rotary optical means.

In other words, the optical fiber bundle 11 is held by a member 10 rotated by the motor 4 as shown in FIG. 6, one of the end surfaces of this optical fiber bundle 11 is disposed at the condensing point, the other end surface is so disposed as to face the cylindrical surface of the cylinder 1, and the optical beams outgoing from this end surface are condensed on the cylindrical surface by the condenser lens 12. In this case, the condenser lens 12 is rotated integrally with the optical fiber bundle 11 by the motor 4.

In the embodiment shown in FIG. 1, the motor 7 for rotating the anamorphic optical systems 5 and 6 as the optical beam rotation means comprises a cylindrical member as a rotor 31 and a stationary cylindrical stator 32 encompassing the rotor 31, and the anamorphic optical systems 5 and 6 are held in place inside the rotor 31.

In this case, a bearing for holding the cylindrical rotor 31 must be disposed outside the rotor 31. Accordingly, this arrangement is structurally difficult because the diameter of the bearing 33 becomes great.

It is therefore advisable to use a motor 34 comprising a stationary shaft 35 and a rotor 36 (hereinafter referred to as an "outer rotor") rotating round this stationary shaft 35 in the form shown in FIGS. 7, 8 and 9.

Figure 7:
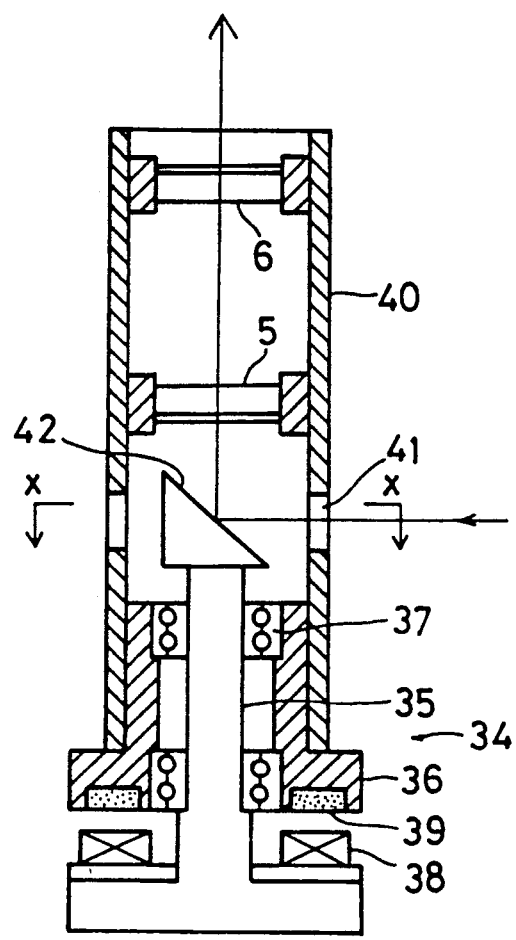
FIG. 7 is a view showing another structural example of a motor for optical beam rotation means.
Figure 8:
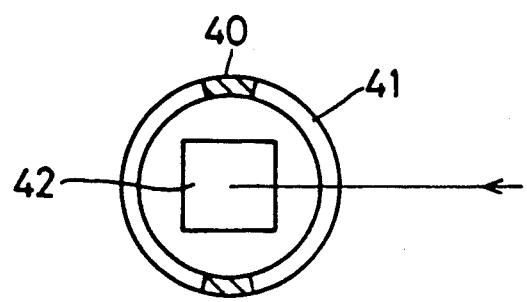
FIG. 8 is a sectional view taken along a line x—x of FIG. 7.
Figure 9:
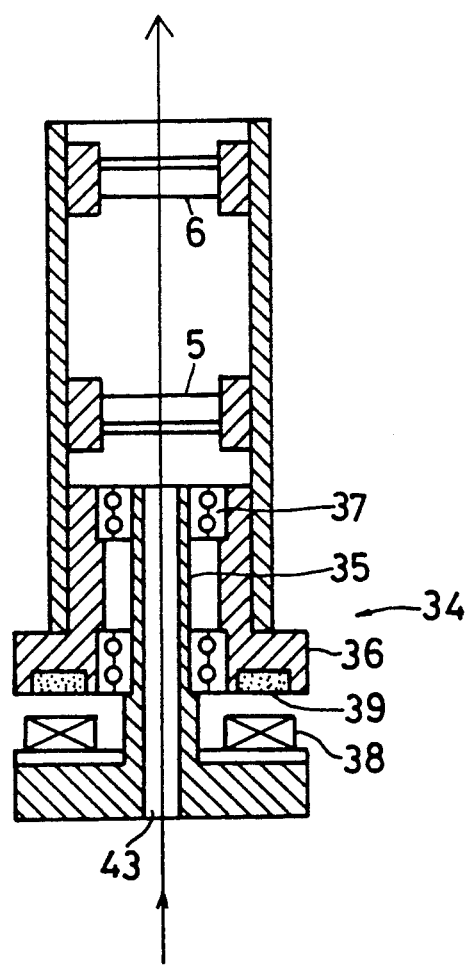
FIG. 9 is a sectional view showing another structural example of the motor for the optical beam rotation means.

In the example shown in FIGS. 7, 8 and 9, the outer rotor 36 is supported by the stationary shaft 35 through a bearing 37, and is rotated by an electromagnet 38 on the side of the stationary shaft 35 and by a permanent magnet 39 on the side of the outer rotor 36. A cylindrical member 40 is fitted to the outer rotor 36 so as to support the anamorphic optical systems 5 and 6.

In the embodiment shown in FIGS. 7 and 8, the optical beam is allowed to be incident at an angle of 45° into a reflecting mirror 42 fixedly disposed at the tip of the stationary shaft 35 through a slit-like opening 41 formed on the peripheral wall of the cylindrical member 40, and the reflected beam is guided to the anamorphic optical systems 5 and 6 in parallel with the axis of rotation.

In the embodiment shown in FIG. 9, a hole 43 is bored at the center of the stationary shaft 35 in the axial direction, and the optical beam is guided to the anamorphic optical systems 5 and 6 through the hole 43 of the stationary shaft 35.

The motor 34 having the structure wherein the rotor 36 rotates outside the stationary shaft 35 has been spared relatively widely, and has the advantages that it does not need the use of a bearing having a large diameter and its production is not structurally difficult.

In the embodiment shown in FIGS. 7 and 8, it is not possible to define the opening 41 throughout the full periphery, and there is the case where the optical beam is intercepted by the cylindrical member 40.

However, the effective scanning range of the internal drum scanning system is generally limited to up to about 270° among the full periphery of 360° due to inlet and outlet opening of the photosensitive material and the holding means of the scanning mechanism.

Assuming that the effective range is 270° and the ineffective range is 90°, there effective and ineffective ranges correspond to 135° and 45° in terms of the rotating angles of the anamorphic optical systems 5 and 6, respectively.

Accordingly, it is possible to prevent the interception of the optical beam during scanning operation of the effective scanning range by forming the slit-like opening 41 in such a manner as to leave two portions of an angle a little smaller than 45° on the periphery of the cylindrical member 40 for holding the anamorphic optical systems 5 and 6.

In this instance, the opening 41 may be made of a transparent member, too. In such a case, the full periphery of the cylindrical member 40 may be shaped into the opening, provided that optical uniformity of the transparent material and aberration by the member do not render any problems.

In the case of FIG. 9, a special design motor must be produced because the hole 43 must be bored at the center of the stationary shaft 35, but the increase in the cost of production will not be much high because only the hole 43 for the passage of the optical beam must be formed and the rest of components need not be changed.

When the necessary rotating speed is low, undirect driving may be effected through mechanical rotation transmission means such as gears from the motor.

Though the explanation deals with the cylindrical lens as the example of the anamorphic optical system, other means can also be used so long as they have the effect of moving the optical beams to positions of substantial symmetry of plane with respect to a specific plane by the difference of powers of the anamorphic optical system.

Coaxiality of the rotation of a plurality of optical beams on the outgoing side will be higher if the two anamorphic optical systems have the same focal length, but the focal length need not necessarily be equal depending on required accuracy.

Though FIG. 3 shows the example where the outgoing points of a plurality of optical beams are aligned in a line on a lane including the axis of rotation, but the present invention is not particularly limited to such an example.

Figure 10:
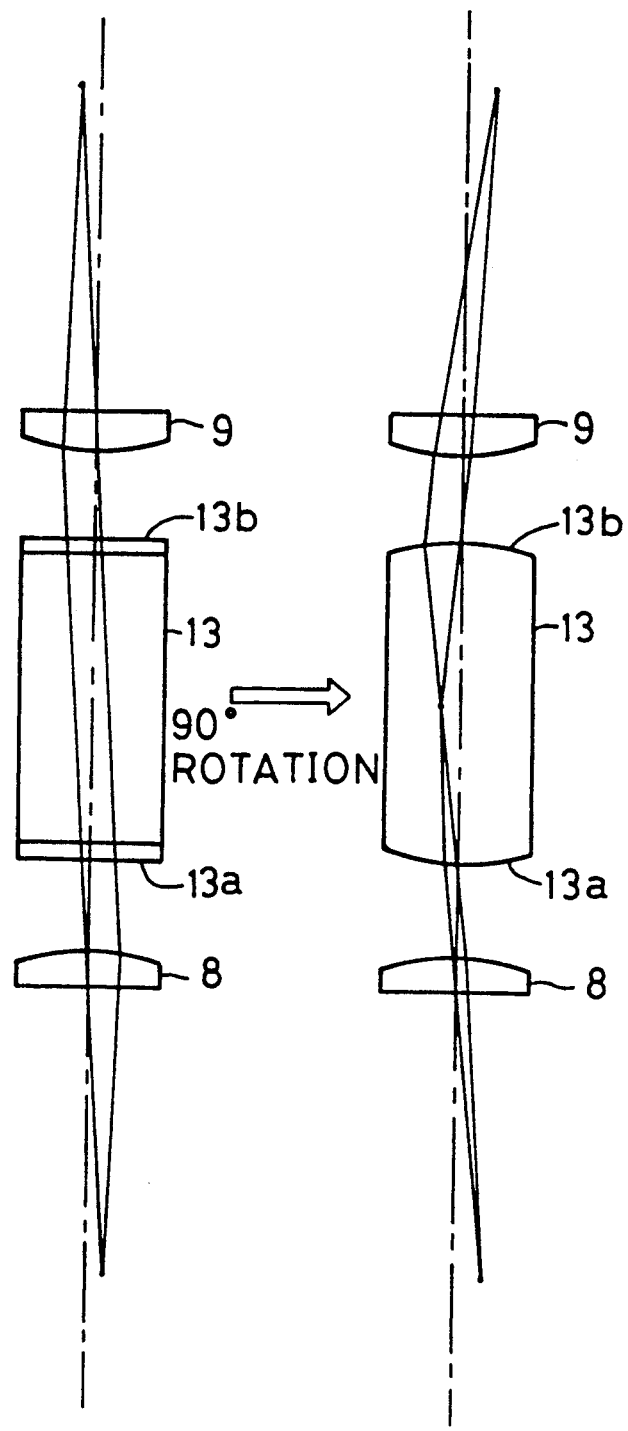
FIG. 10 is a view showing another example of anamorphic optical system.
Figure 11:
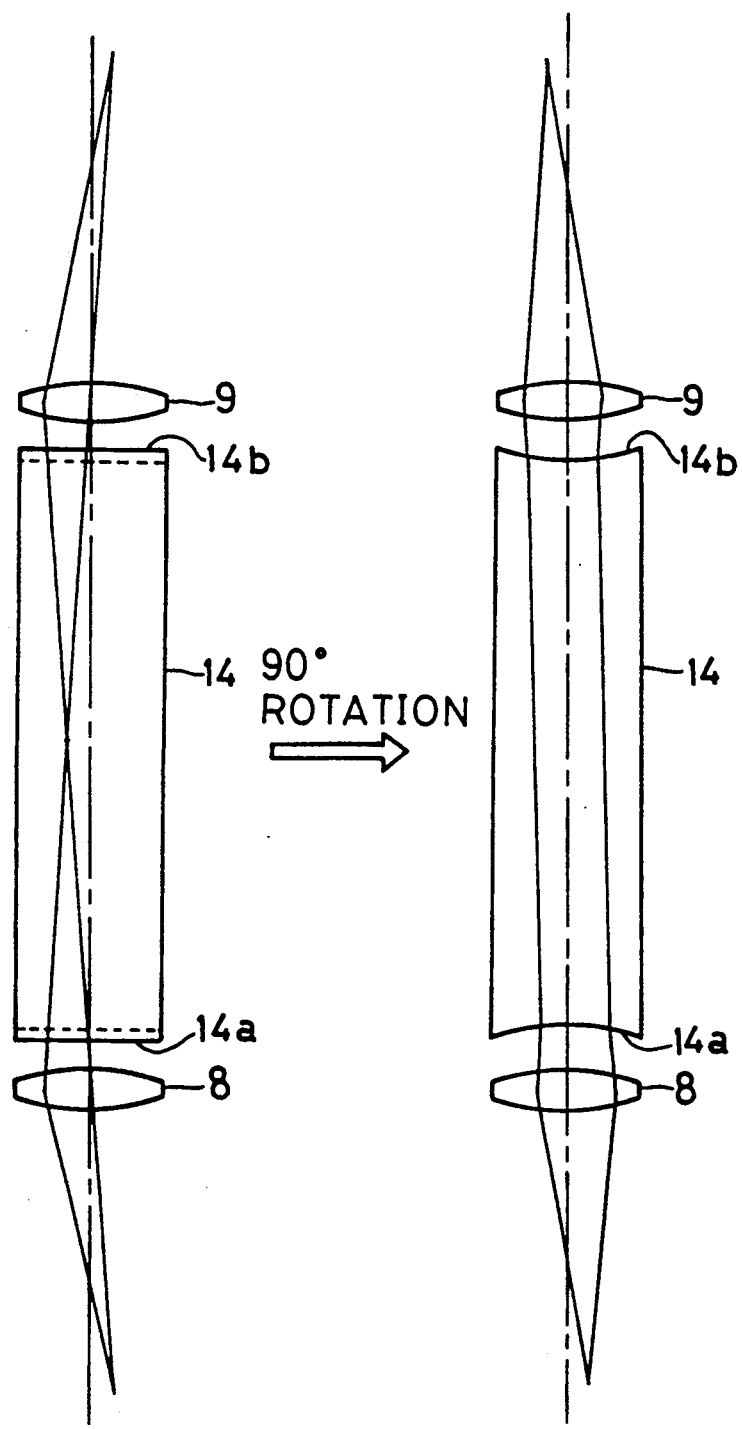
FIG. 11 is a view showing still another example of the anamorphic optical system.

In FIG. 3, the two cylindrical lenses 5 and 6 are shown disposed at the positions at which the optical beams are substantially collimated, but the optical beam rotating function is not limited to such an arrangement but can be accomplished by the arrangement shown in FIG. 10 or 11 by the anamorphic optical systems.

FIG. 10 shows another embodiment which uses on cylindrical lens 13 having convex cylindrical surfaces 13a and 13b at both ends thereof. This embodiment substantially has the two anamorphic optical systems.

FIG. 11 shows another embodiment which uses one cylindrical lens 14 having concave cylindrical surfaces 14a and 14b at both ends thereof, and this embodiment substantially has the two anamorphic optical systems.

Figure 12:
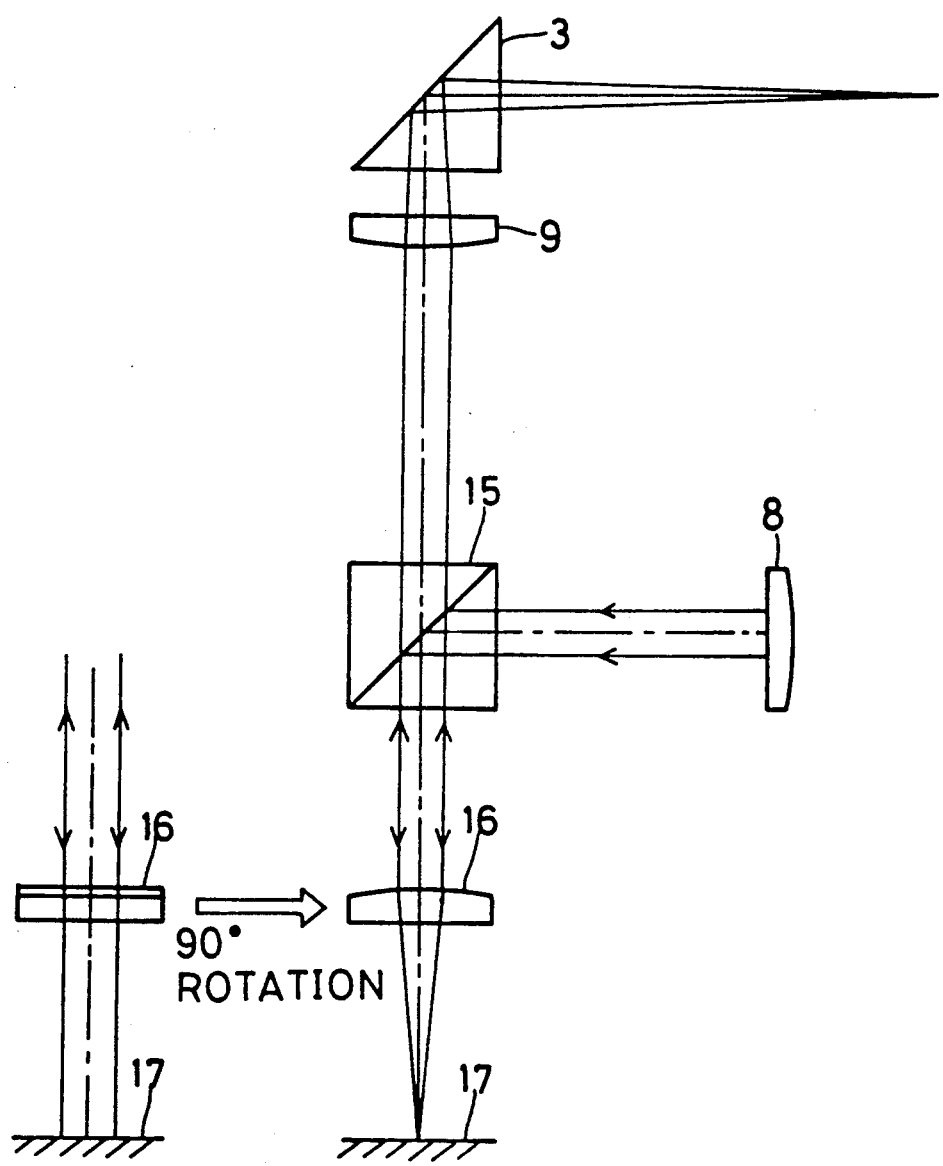
FIG. 12 is a view showing another embodiment wherein the anamorphic optical system and a reflecting plane are combined with each other.

Next, another embodiment using one anamorphic optical system in combination with a reflecting plane, which reflects the optical beams in such a manner as to pass twice through the anamorphic optical system, as the optical beam rotation means will be explaned with reference to FIG. 12.

This embodiment is optically the same as embodiment wherein two same anamorphic optical systems are combined with each other. One of the advantages of this embodiment resides in that even when direct rotation is attained by the motor, a hollow motor need not always be necessary.

Figure 13:
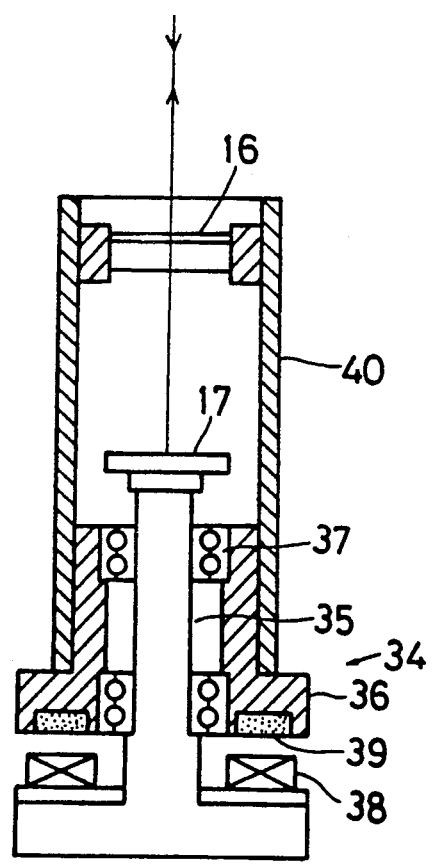
FIG. 13 is a sectional view showing a structural example of a motor for the optical beam rotation means in the case of FIG. 12.

More definitely, the optical beams passing through the collimator lens 8 are partly reflected by the beam splitter 15 and are allowed to be incident into the anamorphic optical system (cylindrical lens) 16, and the outgoing beams are reflected by the reflecting surface (reflecting mirror) 17 and are again allowed to be incident into the anamorphic optical system 16. Then, the outgoing beams from this optical system 16 are partly passed through the beam splitter 15 and the transmitted beams are guided to the cylindrical surface by the rotary reflection device 3 while being condensed by the condenser lens 9. In this case, too, the anamorphic optical system 16 is rotated at a rotating speed of ½ of the rotating speed of the rotary reflection device 3. An example of the rotation mechanism is shown in FIG. 13.

When the anamorphic optical system and the reflecting surface are used as described above, the method using the beam splitter 15 as shown in FIG. 12 is suitable because the incident beams into the anamorphic optical system and the outgoing beams after reflection are close to one another.

When a beam splitter having 50% reflection and 50% transmission functions is used as the beam splitter 15, the power of condensed beams decrease to maximum 25% of the incident beams, but there occurs no problem so long as the sensitivity of the photosensitive material is sufficiently high, or the output of the light source is sufficiently great.

Figure 14:
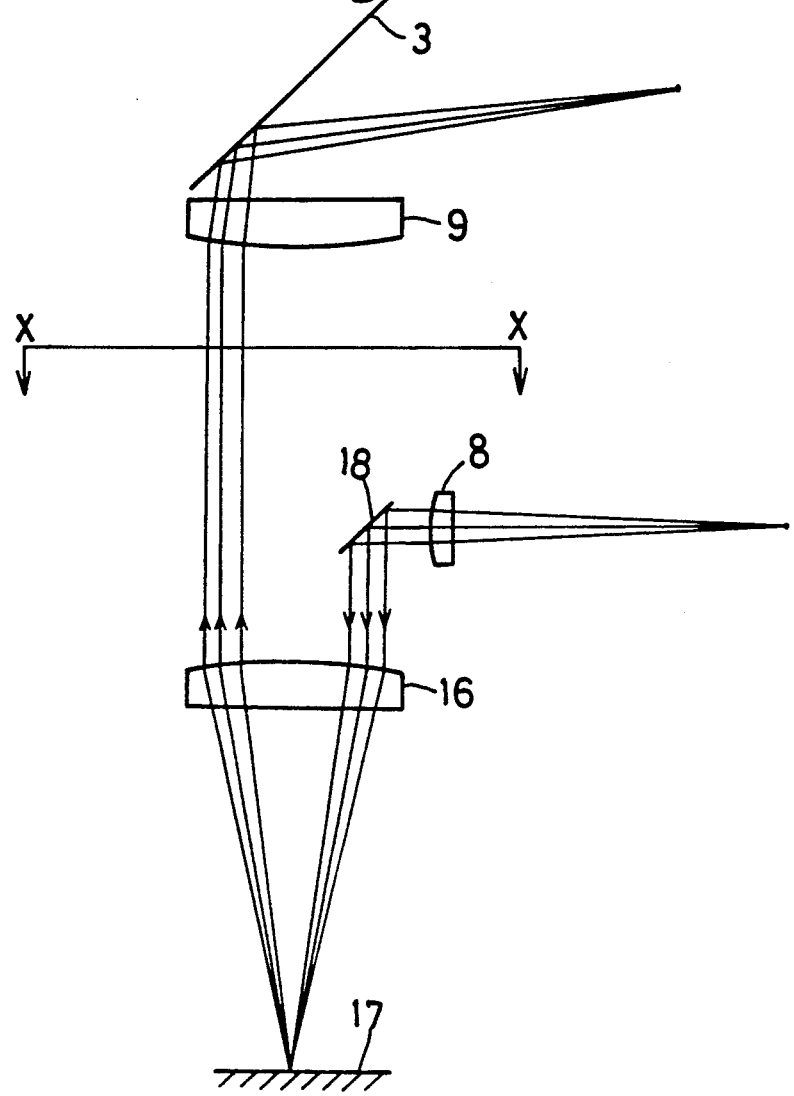
FIG. 14 is a view showing the mode of use of another embodiment wherein the anamorphic optical system and the reflecting plane are combined.
Figure 15:
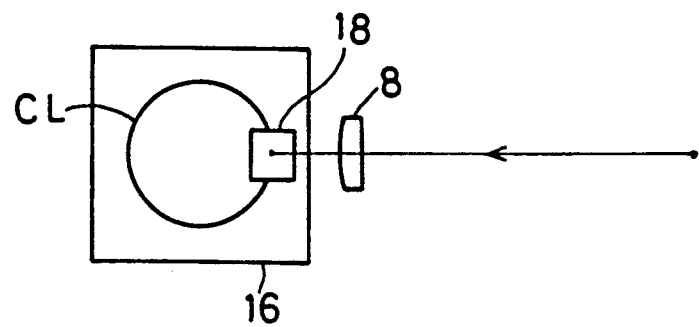
FIG. 15 is a sectional view taken along a line x—x of FIG. 14.

Provided that the center of rotation is slightly spaced apart from the incident beam trains and the diameter of the circle described by the outgoing beams after reflection (circle CL in the drawing) can be made sufficiently greater than the size of the beams however, the beam splitter is not always necessary, as illustrated in FIGS. 14 and 15. In such a case, an ordinary small reflection mirror 18 is necessary. In other words, it is a part of the region on the periphery at which the outgoing beams after reflection come close to the incident beams. Accordingly, even when the ordinary reflecting mirror 18 is used in place of the beam splitter, the zone in which the outgoing beams are intercepted by the reflecting mirror 18 is only a part of the region, and there occurs no practical problem. In the case of internal drum scanning, a part of the regions of the periphery is ordinarily a region which is not used for recording, due to inlet and outlet opening of the photosensitive material and other mechanical limitations. Therefore, this non-recording region may be brought into conformity with the intercepted region described above.

A reflecting mirror may be used as fixed, as the reflecting surface 17 to be combined with the anamorphic optical system 16 (see FIG. 13), or may be rotated with the anamorphic optical system 16.

If the reflecting mirror is fixed or stationary, a considerably specific motor such as a hollow shaft motor with pipe-shaft or a motor having a stationary shaft and an outer rotor becomes necessary, but here is the advantage that satisfactory scanning can be obtained easily because the reflecting mirror is fixed and surface vibration of the reflecting mirror due to the rotation does not occur.

When the reflecting mirror is rotated, the structure of optical beam rotation means inclusive of the motor can be simplified. In other word, the specific motor such as the hollow shaft motor or the motor having the stationary shaft and the outer rotor becomes unnecessary.

Figure 16:
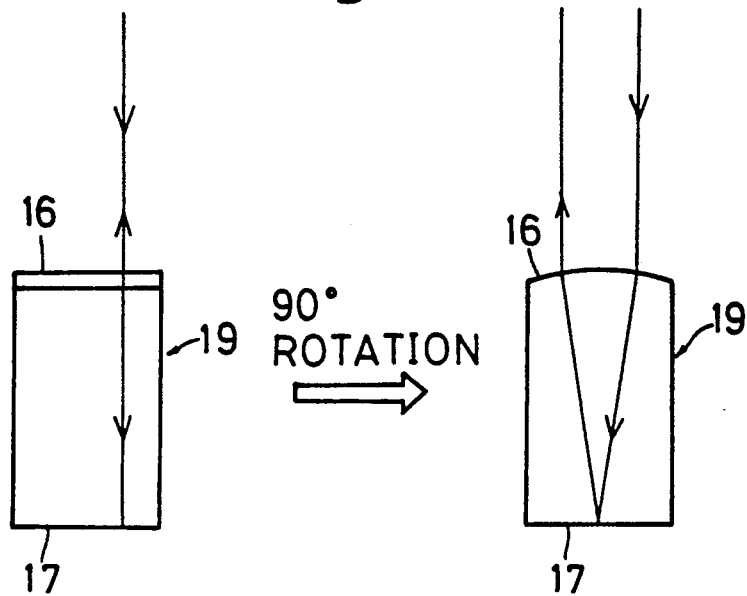
FIG. 16 is a view showing another embodiment wherein the anamorphic optical system and the reflecting plane are combined.

It is further possible to use an optical system 19 including the anamorphic optical system 16 and the reflecting surface 17 integrated with each other, as shown in FIG. 16.

Figure 17:
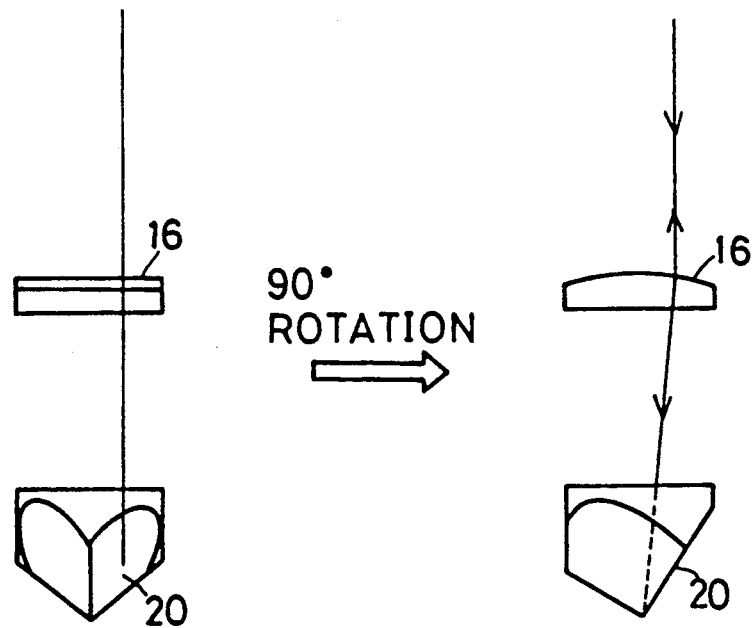
FIG. 17 is a view showing still another embodiment wherein the anamorphic optical system and the reflecting plane are combined.

A corner cube 20 may be used as the reflecting mirror to be combined with the anamorphic optical system 16, as shown in FIG. 17.

The corner cube 20 comprises three, mutually rectangular planes. Unlike the rectangular prism, the reflected beams are not rotated even when the corner cube 20 is rotated. As is well known in the art, even when the corner cube 20 itself inclines, the direction of the reflected beams remains always in parallel with the incident beams. Accordingly, satisfactory scanning can be obtained easily even when the corner cube 20 is rotated with the anamorphic optical system 16.

Another advantage brought forth by the use of the corner cube 20 is as follows. The section of the optical beams has an extremely thin linear shape on the focal plane of the anamorphic optical system 16. If an ordinary reflecting mirror is located on this plane, any contamination and scratches of the reflecting mirror exert great influences on the optical beams. When the corner cube 20 is used, on the other hand, it is almost inside the medium of the corner cube 20 that the optical beams are linearly condensed to linear pattern, and furthermore, since there is few possibility of contamination and scratches, no adverse influences are exerted on the optical beams.

It is also effective to use three planar reflecting mirrors in place of the corner cube 20. In this case, the optical beams are mostly condensed into a linear shape in the air space where the possibility of contamination and scratches is low. Therefore, the optical beams are not affected adversely.

Next, an embodiment wherein a member having a set of reflecting surfaces combined rectangularly with each other is used as an optical structure of the optical beam rotation means will be explained with reference to FIG. 18.

Here, a rectangular prism 21 is used, and a set of reflecting surfaces are two surfaces 21a and 21b sandwiching therebetween the right angle of the rectangular prism 21.

Figure 18:
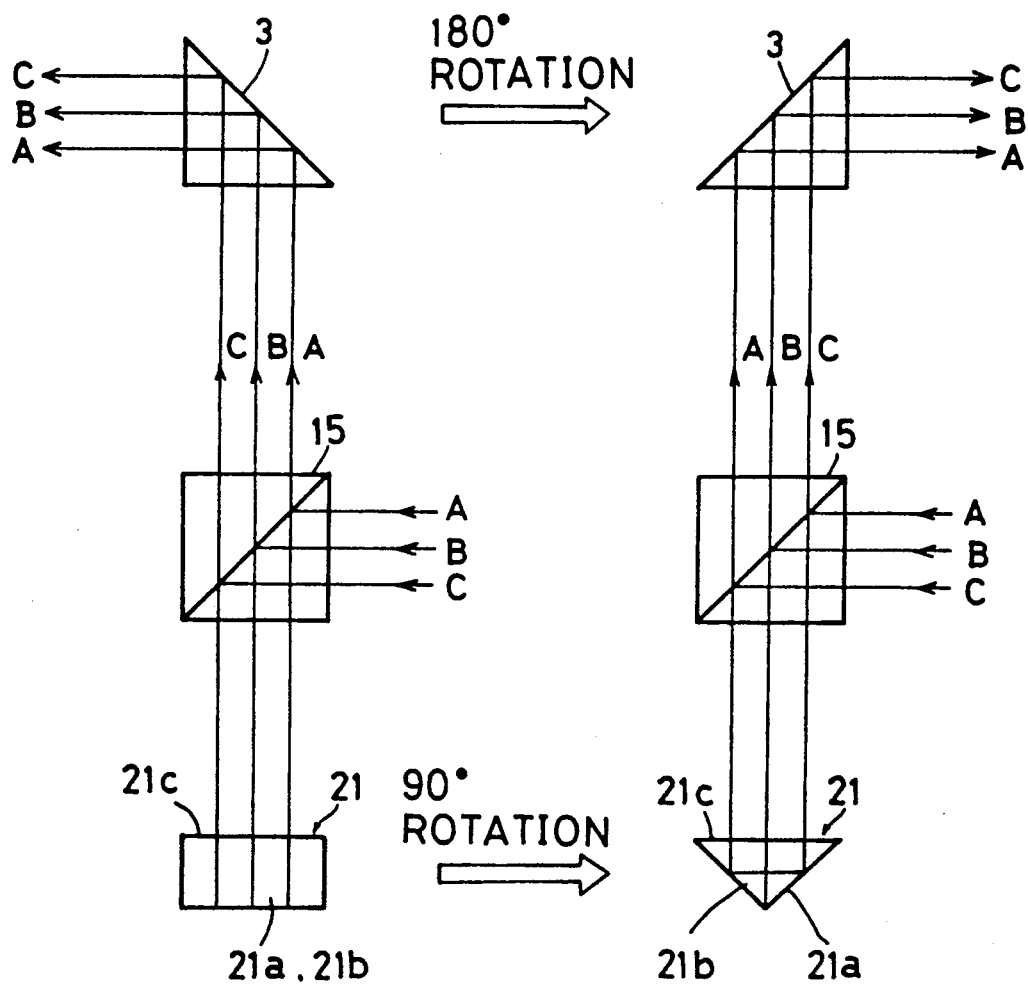
FIG. 18 is a view showing an embodiment wherein a rectangular prism is used as the optical beam rotation means.

More definitely, the optical beams passing through the collimator lens (not shown in the drawing) are partly reflected by the beam splitter 15 and are guided to the rectangular prism 21 as shown in FIG. 18. After these beams are reflected by the rectangular prism 21, the reflected beams are allowed to partly transmit through the beam splitter 15 and the transmitted beams are condensed by the condenser lens (not shown) and are guided to the cylindrical surface by the rotary reflection device 3.

In this case, the surface 21c which ordinarily describes an angle of 45° to the two surfaces 21a and 21b interposing therebetween the right angle of the rectangular prism 21 is held perpendicularly to the incident beams, and the rectangular prism 21 is rotated at a rotating speed of ½ of that of the rotary reflection device 3 with a line, which is substantially in parallel with the incident beams, as the axis of rotation.

Then, the beams that are sequentially reflected by the two surfaces 21a and 21b interposing the right angle and outgo from them reach the positions which are substantially asymmetry of plane with respect to the plane including the ridgeline of the right angle and in parallel with the incident beams.

Accordingly, when the axis of rotation of the rectangular prism 21 includes the ridgeline described above and coincides with the plane which is in parallel with the incident beams, the trajectory of the reflected beams describes a circle, and rotates twice when the rectangular prism 21 rotates once. In this way, there can be obtained the optical beam rotating function in the same way as in the embodiment shown in FIG. 12. Unlike the embodiment shown in FIG. 12, on the other hand, a delicate adjustment of aligning the focus of the reflecting mirrors with that of the anamorphic optical system is not necessary.

Accordingly, if the rotary reflection device 3 is rotated around the same axis of rotation and at the same rotating speed as the optical beams, each of the optical beams describes a parallel trajectory on the cylindrical surface as can be understood from the geometric observation. In this way, a plurality of optical beam lines can be scanned in parallel with one another on the cylindrical surface.

Figure 19:
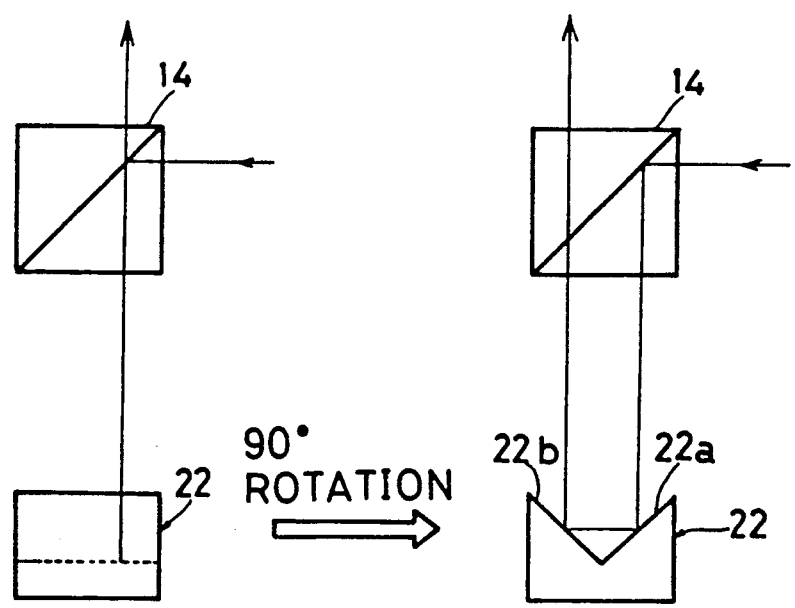
FIG. 19 is a view showing an optical system that can be used in place of the rectangular prism shown in FIG. 18.

An optical system 22 having a set of reflecting surface 22a and 22b which are rectangular to each other as shown in FIG. 19 may be used in place of the rectangular prism 21.

Next, an optical structure of the optical beam rotation means, which comprises optical means for refracting, reflecting or diffracting the optical beams and a set of reflecting surfaces, which are disposed on the extension of the optical path of the optical beams passing through the optical means, one of which is at right angles to the axis of rotation, the other of which is in parallel with the axis of rotation, and which are in parallel with each other, will be explained with reference to FIG. 20.

Here, the case where a semi-trapezoidal prism 23 obtained by splitting a trapezoidal prism is used, will be explained by way of example.

Figure 20:
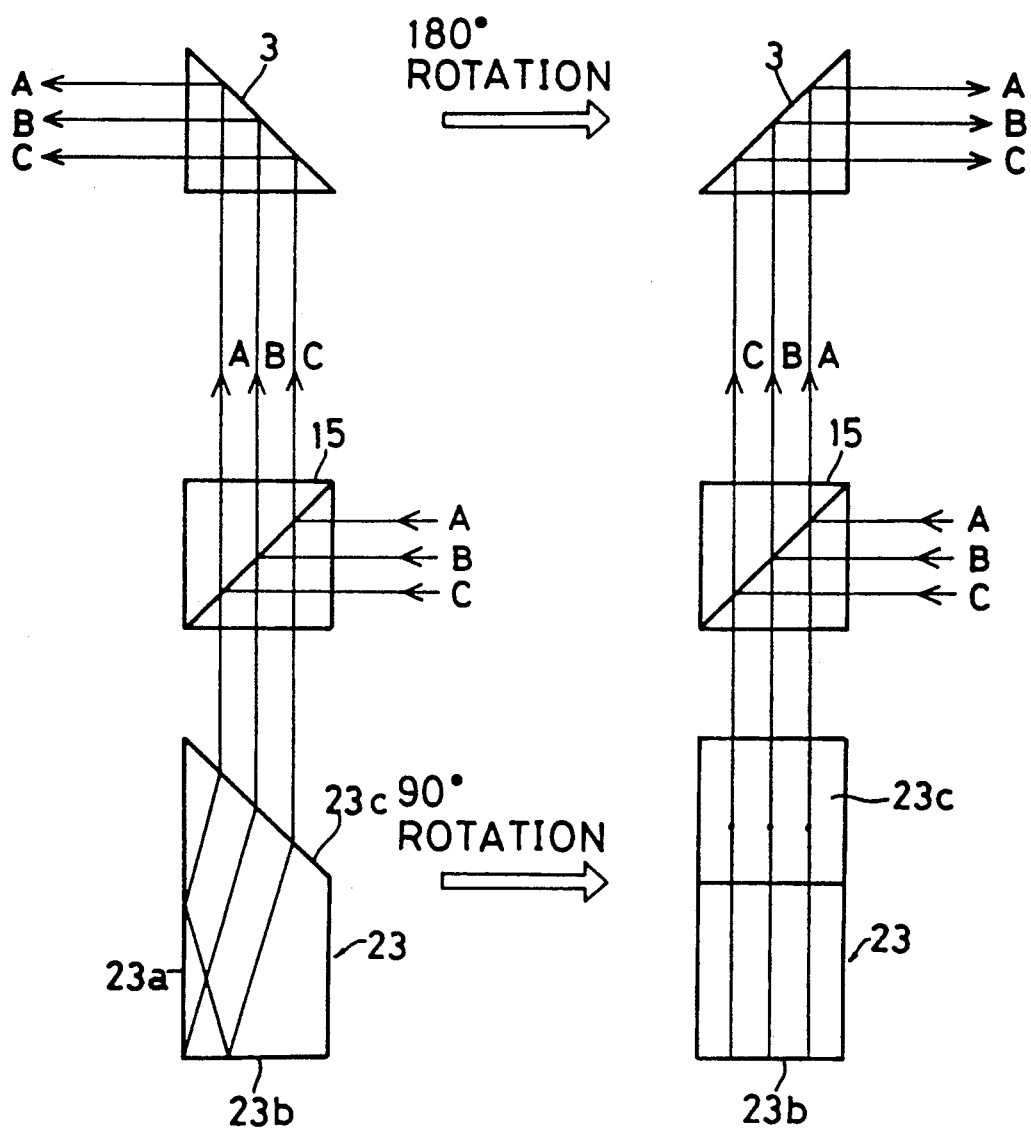
FIG. 20 is a view showing another embodiment wherein a semi-trapezoidal prism is used as the optical beam rotation means.

More definitely, the optical beams passing through the collimator lens (not shown in the drawing) are partly reflected by the beam splitter 15 and are guided to the semi-trapezoidal prism 23, where the beams are refracted and reflected, and are then transmitted partly by the beam splitter 15, and the transmitted beams are condensed by the condenser lens (not shown in the drawing) and are guided to the rotary reflection device 3 to the cylindrical surface as shown in FIG. 20.

In this case, one 23a of the mutually rectangular surfaces 23a, 23b of the semi-trapezoidal prism 23, that corresponds to the bottom of the trapezoid, is held in parallel with the incident beams and the other surface 23b corresponding to the halved side is held at right angles to the incident beams. The semi-trapezoidal prism 23 is rotated at a rotating speed of ½ of that of the rotary reflection device 32 with a straight line substantially in parallel with the incident beams as the axis of rotation. The incident beams are refracted on the slope surface 23c, are first reflected by one of the mutually rectangular surfaces 23a and 23b, and then by the other, are again refracted on the slope surface 23c, and are thereafter allowed to outgo.

As can be understood from the drawing, when this semi-trapezoidal prism 23 is rotated by 90°, for example, the optical beams are rotated by 180°. Accordingly, this embodiment, too, has the optical beam rotating function. Since the rotary reflection device 3 rotates by 180° at this time, parallel beam lines can be formed on the cylindrical surface.

Next, an optical structure of the optical beam rotation means, which comprises optical means for refracting, reflecting or diffracting the optical beams, and a set of reflecting surfaces which are disposed on the extension of the optical path of the optical beams passing through the optical means, cross one another at right angles and the crossing straight lines of which are in parallel with the axis of rotation, will be explained with reference to FIG. 21.

Figure 21:
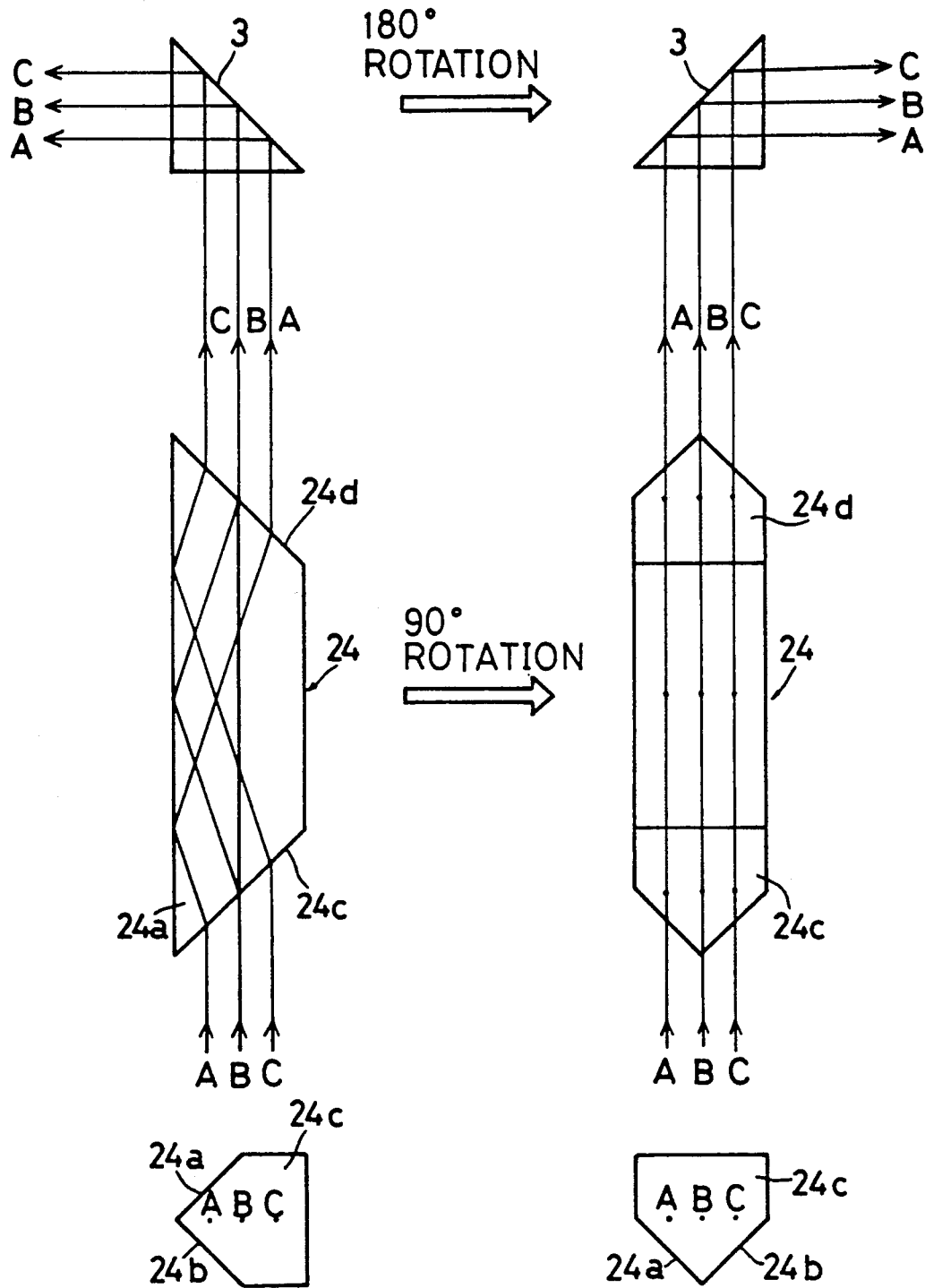
FIG. 21 is a view showing another embodiment wherein a roof prism is used as the optical beam rotation means.

FIG. 21 shows an embodiment wherein the reflecting surfaces of the trapezoidal prism are replaced by two plane mirrors describing an angle of 90° with each other. For simplification, these two plane mirrors will hereinafter be referred to a "roof prism".

More definitely, the optical beams passing through the collimator lens (not shown in the drawing) are guided to the roof prism 24 as shown in FIG. 21, are then refracted and reflected by the roof prism 24, are then condensed by the condenser lens (not shown in the drawing), and are guided to the cylindrical surface by the rotary reflection device 3.

In this case, the crossing straight line of the mutually rectangular surfaces 24a and 24b of the roof prism 24 is kept in parallel with the incident beams, and the roof prism 24 is rotated at a rotation speed of ½ of that of the rotary reflection device 3 with the straight line, which is substantially in parallel with the incident beams, as the axis of rotation. The incident beams are refracted on the slope surface 24c, are reflected by either one of the mutually rectangular surfaces 24a and 24b, are then refracted on the slope surface 24d on the other side, and are thereafter allowed to outgo.

As can be seen clearly from the drawing, when this roof prism 24 is rotated by 90°, for example, in this case, the optical beams are rotated by 180°. Thus, this embodiment, too, has the optical beam rotating function. At this time, since the rotary reflection device 3 rotates by 180°, beam line which are in parallel with one another on the cylindrical surface can be formed.

Figure 22:
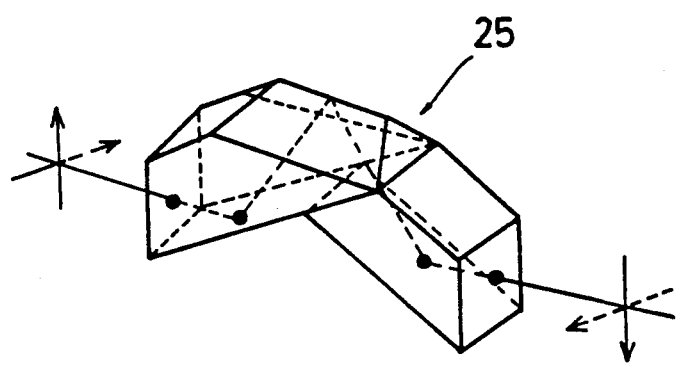
FIG. 22 is a view showing an Abbe prism.

Furthermore, an Abbe prism 25 may be used in place of the roof prism 23 as shown in FIG. 22.

Means for rotating the rotary optical means such as the rotary reflection device 3 and the optical beam rotation means such as the anamorphic optical systems 5, 6 at a predetermined ratio of rotating speeds may use a plurality of motors in accordance with well known PLL control. This can also be accomplished by using a plurality of synchronous motors. The rotating speeds having a predetermined relation can be obtained by mechanical means such as gears, chains, belts, and so fourth, by the use of the single motor.

When a plurality of beams are condensed on the cylindrical surface to form the condensed beam lines, the beam lines must be kept at right angles to the main scanning direction, that is, to the beam moving direction, or must be kept at a predetermined angle with a predetermined inclination. The gaps of the primary scanning lines are determined by such an angle.

Whether the angle is variable or stationary is determined in accordance with the intended object of the scanner of the present invention. To set the beam lines to a predetermined angle, however, the phase relationship of rotation between the rotary reflection device and the optical beam rotation means must be kept at a predetermined value.

When the beam lines are inclined in the direction rectangular to the main scanning direction on the cylindrical surface, an image is formed by applying the recording signals for each beam line by deviating the timing in accordance with the deviation distance in the primary scanning direction.

An example of the method of setting the phase relationship between the rotary reflection device and the optical beam rotation means to a predetermined value will be explained below.

Figure 23:
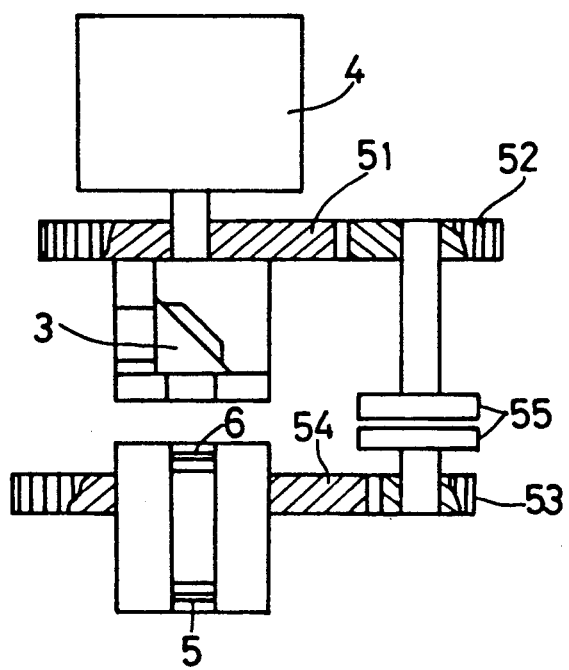
FIG. 23 is a view showing a structural example wherein synchronous rotation is accomplished by a single motor.

FIG. 23 shows an embodiment wherein the rotary reflection device 3 and the anamorphic optical systems 5, 6 are rotated synchronously by a single motor 4 though gears 51 to 54.

In this case, the phase relationship of both of them is made variable by means such as a clutch mechanism 55, whenever necessary.

Figure 24:
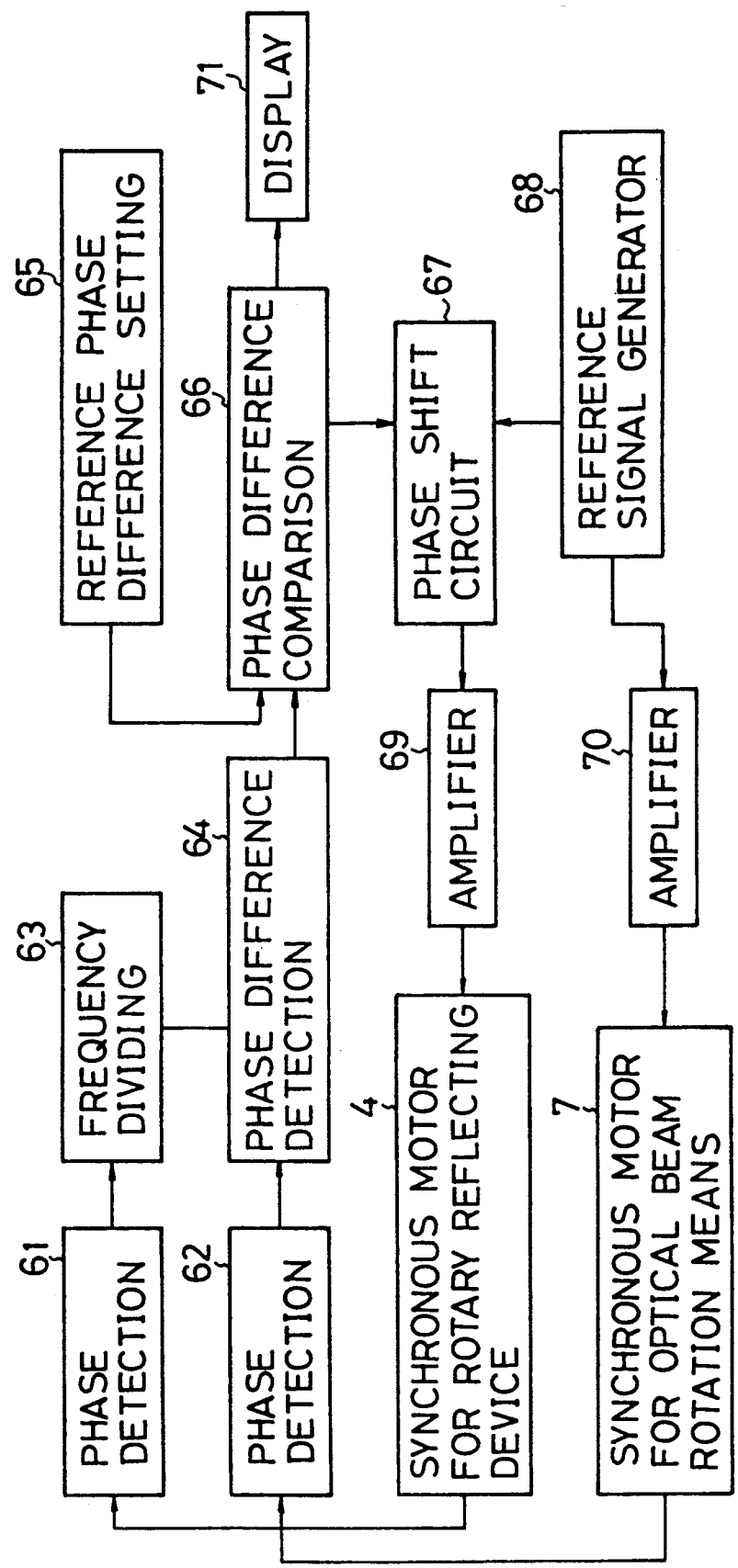
FIG. 24 is a block circuit diagram for accomplishing synchronous rotation by separate motors.

FIG. 24 is a block diagram of the embodiment wherein their rotation is controlled by separate synchronous motors 4 and 7.

In this embodiment, when the synchronous motors 4 and 7 start operating and reach predetermined rotating speeds, the phases are detected by respective phase detection circuits 61 and 62, and their phase difference is detected by a phase difference detection circuit 64 after being passed through a frequency dividing circuit 63, whenever necessary. This phase difference is compared with a reference phase difference set by a reference phase difference setting circuit 65, by a phase comparison circuit 66. When the reference signals are applied to both synchronous motors 4 and 7 from a reference signal generator 68 through amplifiers 69 and 70, the phase of the reference signal to be applied to one of the synchronous motors is shifted by a phase shift circuit 67 so as to adjust the phases of both synchronous motors 4 and 7. A display circuit 71 displays the phase difference, while the reference phase difference setting circuit 65 makes setting of the reference phase difference variable.

In FIGS. 3 and 4, the direction of alignment of the optical beams condensed on the cylindrical surface can be changed by rotating the direction of alignment of the points for emitting the three optical beams A, B and C with the travelling direction of the optical beams as the axis of rotation. In this way, the gaps in a direction rectangular to the primary scanning direction can be made variable on the cylindrical surface.

In this case, the intervals of the scanning lines of primary scanning by the optical beams can be changed while the phases of rotation of the rotary reflection device and optical beams rotation means are kept stationary.

Various mechanical and optical means can be used as means for changing the direction of alignment of the points for emitting the optical beams A, B and C, and a suitable method can be selected in accordance with the means for obtaining a plurality of optical beams.

The optical fiber bundle 11 such as the one shown in FIG. 6 can be used in place of the rotary reflection device 3, as the rotary optical means, as has already been described.

When the optical fiber bundle 11 is used, the angle of alignment of a plurality of optical beams on the cylindrical surface is determined by the direction of alignment of the end surfaces of the optical fiber bundle 11 on the outgoing side and by the condenser means.

Unlike the case where the rotary reflection device 3 is employed, the direction of alignment of the optical beams on the cylindrical surface cannot be made changeable by the phase relationship between the rotary optical means and the optical rotation means.

The arrangement of the end surfaces of the optical fiber bundle 11 on the outgoing side may be such that the arrangement is suitable for optical beam recording when the image of the end surfaces is projected on the cylindrical surface by the condenser lens 12.

Figure 25A:
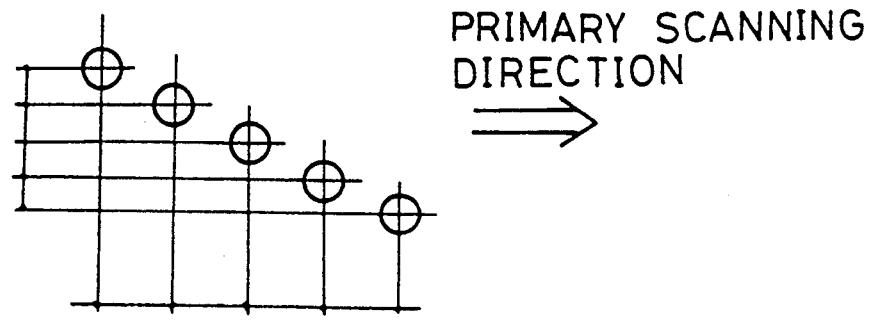
FIGS. 25(a) and 25(b) are views showing an example of the arrangement of the end surfaces on the outgoing side when an optical fiber bundle is used.
Figure 25B:
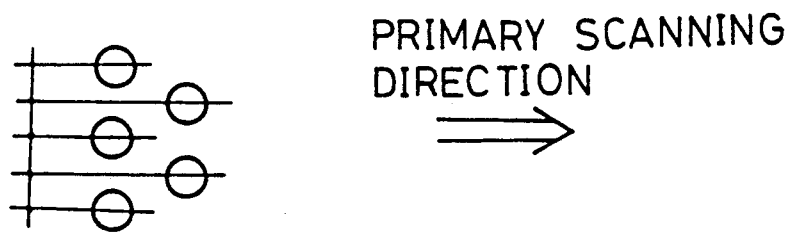

FIGS. 25(a) and 25(b) show an example of such an arrangement.

The intervals must be substantially equal with respect to the direction rectangular to main scanning. As to the primary scanning direction, the gaps need not be equal, but if the intervals are equidistant as shown in FIG. 25(a) the timing difference of the image signals applied to the optical beams can be made constant. When a large number of optical fibers are used, an arrangement such as the one shown in FIG. 25(b) may be employed in order to prevent the aperture necessary for the condenser lens 12 from becoming too great.

It is obvious that the angle of alignment of the optical beams on the cylindrical surface can be adjusted by adjusting the angle of alignment of the end surfaces of the optical fiber bundle 11 on the outgoing side.

When the optical fiber bundle 11 is used, the diameter of the optical beams on the cylindrical surface can be made easily small by disposing the end surfaces of the optical fibers on the outgoing side, the lens, etc., near the cylindrical surface. In this case, the moment of inertia of the rotary optical means becomes great, and the number of revolution cannot be increased so easily. Nonetheless, there is the advantage that high image quality can be obtained easily because the optical beams diameter can be made small on the cylindrical surface.

In each of the foregoing embodiments, each beam of multiple beam scanning may be monochromatic, and the present invention can be applied to beams having mutually different wavelengths, as well.

When beams having mutually different wavelengths are used, a single or a plurality of optical beams can be used simultaneously for each wavelength for a plurality of mutually different wavelengths. It is further possible to first record by using a plurality of optical beams at one wavelength and then to record at another wavelength by using a plurality of optical beams.

An optical beam scanning apparatus using mutually different wavelengths will be suitable for a recording operation on a color photosensitive material such as a color film, color photographic paper, etc. by using a light source such as a laser.

According to the optical beam scanning apparatus of the present invention described above, the optical structure as the optical beam rotation means such as the anamorphic optical systems imparts a predetermined rotation to a plurality of beams incident into the rotary optical means, so that a plurality of optical beams outgoing from the rotary optical means do not cross one another but form substantially parallel beam lines on the cylindrical surface during internal drum scanning. Accordingly, multiple beam scanning becomes feasible, and high speed recording becomes possible.

For these reasons, optical beam scanning which is excellent in image quality, recording size and recording speed, can be accomplished.

From the principle, the present invention provides the effect that multiple beam scanning is possible throughout the entire periphery of the cylindrical surface. However, it will be obvious from the foregoing explanation that even when a part of the cylindrical surface is scanned, too, the present invention can prevent the scanning lines from curving.

Another effect brought forth by the present invention is as follows.

When image recording is carried out by scanning the optical beams, the optical beams move at a high speed in the direction of main scanning, while the exposure time for recording one pixel has a definite length. Therefore, the shape of the optical beams condensed on the recording surface preferably is small in the direction of main scanning but is preferably great in the direction rectangular to the former, because the longitudinal and transverse sized of the shape of the pixel to be recorded are more likely to be equal in such a case. As is obvious from the description given above, a single condensed beam itself rotates while it is scanned on the cylindrical surface in the conventional internal drum scanning system. Accordingly, it is difficult for the conventional internal drum scanning configuration to use the shape of the condensed beams having a different aspect ratio as described above.

According to the present invention, the condensed beam does not rotate while scanned on the cylindrical surface, and a predetermined aspect ratio is kept with respect to the direction of the primary scanning line.

I claim:

1. An optical beam scanning apparatus comprising;
   rotary optical means rotating on an axis of rotation, and guiding optical beams incident substantially parallel to said axis of rotation to a direction substantially rectangular to said axis of rotation, for rotating said optical beams in a peripheral direction inside a cylinder and for scanning a cylindrical surface; and
   optical beam rotation means including an optical structure rotating on a straight line substantially coinciding with said axis of rotation as an axis of rotation thereof on the incident side of said optical beams of said rotary optical means, said optical structure comprising a set of reflecting surfaces combined rectangularly with each other and rotating said optical beams incident into said rotary optical means on said straight line as an axis of rotation thereof at the same rotating speed as that of said rotary optical means.

2. An apparatus for recording an image on a photosensitive material by scanning with an optical beam having image information of the image, comprising:
   a cylinder for holding the photosensitive material, wherein the photosensitive material faces an interior of the cylinder and is adapted to be scanned in a circumferential direction thereof;
   means for projecting the optical beam;
   first optical means for transmitting the optical beam projected from the projecting means to the interior of the cylinder in a direction substantially parallel to a central axis of the cylinder, wherein the first optical means includes two anamorphic optical systems, and the optical beam passes through the two anamorphic optical systems;
   means for rotating the first optical means about the central axis, wherein the first optical means rotates the optical beam projected from the projecting means about a rotating axis of the first optical means at a rotating speed twice the rotating speed of the first optical means;
   second optical means for transmitting the rotated optical beam and changing a direction of the optical beam rotated by the first optical means to a direction which is substantially perpendicular to the central axis so as to direct the optical beam onto the photosensitive material; and means for rotating the second optical means about the central axis synchronized with a rotation of the optical beam rotated by the first optical means whereby the image is recorded on the photosensitive material by scanning with the optical beam transmitted from the second optical means.

3. The apparatus of claim 2, wherein the second optical means comprises a rotating member and an optical fiber bundle held in the rotating member, one end surface of the optical fiber bundle being disposed substantially perpendicular to the central axis and an opposite end surface of the optical fiber bundle being disposed substantially parallel to the central axis.

4. The apparatus of claim 2, further comprising reflecting means for transmitting the optical beam projected from the projecting means to the first optical means, wherein the projecting means projects the optical beam into the interior of the cylinder in a direction perpendicular to the central axis, and the reflecting means changes a direction of the optical beam to a direction parallel to the central axis.

5. The apparatus of claim 2, further comprising means for moving one of the cylinder and the second optical means relative to the other in a direction parallel to the central axis.

6. An apparatus for recording an image on a photosensitive material by scanning with an optical beam having image information of the image, comprising:
    a cylinder for holding the photosensitive material, wherein the photosensitive material faces an interior of the cylinder and is adapted to be scanned in a circumferential direction thereof;
    means for projecting the optical beam into the interior of the cylinder in a direction perpendicular to a central axis of the cylinder;
    first reflecting means for changing a direction of the optical beam to a direction parallel to the central axis;
    first optical means for transmitting the optical beam transmitted from the reflecting means in a direction substantially parallel to the central axis, the first optical means including an anamorphic optical system through which the optical beam passes;
    second reflecting means for reflecting the optical beam transmitted from the first optical means to the anamorphic optical system of the first optical means;
    means for rotating the first optical means about the central axis, wherein the first optical means rotates the optical beam projected from the projecting means about a rotating axis of the first optical means at a rotating speed twice the rotating speed of the first optical means;
    second optical means for transmitting the rotated optical beam and changing a direction of the optical beam rotated by the first optical means to a direction which is substantially perpendicular to the central axis to direct the optical beam onto the photosensitive material; and
    means for rotating the second optical means about the central axis synchronized with a rotation of the optical beam rotated by the first optical means whereby the image is recorded on the photosensitive material by scanning with the optical beam transmitted from the second optical means.

7. The apparatus of claim 6, wherein the second optical means comprises a rotating member and an optical fiber bundle held in the rotating member, one end surface of the optical fiber bundle being disposed substantially perpendicular to the central axis and an opposite end surface being disposed substantially parallel to the central axis.

8. The apparatus of claim 6, further comprising means for moving one of the cylinder and the second optical means relative to the other in a direction parallel to the central axis.

9. An apparatus for recording an image on a photosensitive material by scanning with an optical beam having image information of the image, comprising:
    a cylinder for holding the photosensitive material, wherein the photosensitive material faces an interior of the cylinder and is adapted to be scanned in a circumferential direction thereof;
    means for projecting the optical beam;
    first optical means for transmitting the optical beam projected from the projecting means to the interior in a direction substantially parallel to a central axis of the cylinder, wherein the first optical means includes first and second reflecting surfaces arranged perpendicular to each other so that the optical beam projected from the projecting means is reflected at the first reflecting surface to transmit the optical beam to the second reflecting surface and the optical beam is reflected at the second reflecting surface to project from the first optical means;
    means for rotating the first optical means about the central axis, wherein the first optical means rotates the optical beam projected from the projecting means about a rotating axis of the first optical means at a rotating speed twice that of the first optical means;
    second optical means for transmitting the rotated optical beam and changing a direction of the optical beam rotated by the first optical means to a direction which is substantially perpendicular to the central axis to direct the optical beam onto the photosensitive material; and
    means for rotating the second optical means about the central axis synchronized with a rotation of the optical beam rotated by the first optical means whereby the image is recorded on the photosensitive material by scanning with the optical beam transmitted from the second optical means.

10. The apparatus of claim 9, further comprising reflecting means for transmitting the optical beam projected from the projecting means to the first optical means, wherein the projecting means projects the optical beam into the interior of the cylinder in a direction perpendicular to the central axis, and the reflecting means changes a direction of the optical beam to a direction parallel to the central axis so as to transmit the optical beam to the first reflecting surface of the first optical means.

11. The apparatus of claim 10, wherein the second optical means comprises a rotating member and an optical fiber bundle held in the rotating member, an end surface of the optical fiber bundle being disposed substantially perpendicular to the central axis and the other end surface being disposed substantially parallel to the central axis.

12. The apparatus of claim 10, further comprising means for moving one of the cylinder and the second optical means relative to the other in a direction parallel to the central axis.

13. The apparatus of claim 10, wherein the first reflecting surface of the first optical means is perpendicular to the central axis and the second reflecting surface is parallel to the central axis.

14. The apparatus of claim 13, wherein the second optical means comprises a rotating member and an optical fiber bundle held in the rotating member, an end surface of the optical fiber bundle being disposed substantially perpendicular to the central axis and an opposite end surface being disposed substantially parallel to the central axis.

15. The apparatus of claim 13, further comprising means for moving one of the cylinder and the second optical means relative to the other in a direction parallel to the central axis.

16. The apparatus of claim 9, wherein a crossing line of the first and second reflecting surfaces is parallel to the central axis.

17. The apparatus of claim 16, wherein the second optical means comprises a rotating member and an optical fiber bundle held in the rotating member, an end surface of the optical fiber bundle being disposed substantially perpendicular to the central axis and the opposite end surface being disposed substantially parallel to the central axis.

18. The apparatus of claim 16, further comprising reflecting means for transmitting the optical beam projected from the projecting means to the first optical means, wherein the projecting means projects the optical beam into the interior of the cylinder in a direction perpendicular to the central axis, and the reflecting means changes a direction of the optical beam to a direction parallel to the central axis.

19. The apparatus of claim 16, further comprising means for moving one of the cylinder and the second optical means relative to the another in a direction parallel to the central axis.

* * * * *